United States Patent
Burfield et al.

(12)

(10) Patent No.: US 6,298,334 B1
(45) Date of Patent: Oct. 2, 2001

(54) OBJECT-BASED NUMERIC-ANALYSIS ENGINE

(75) Inventors: Evan G. Burfield, Fairfax; Chia Chen Chang, McLean, both of VA (US); Mark Drissel, Columbia, MD (US); Matthew Eichler, Arlington; Richard Garrett, Fairfax, both of VA (US); Robert Groat, Valley Lee, MD (US); Neill Kipp, Blacksburg, VA (US); Perry Russell Rapp, Lexington Park, MD (US)

(73) Assignee: NetDecide Corporation, Falls Church, VA (US)

( * ) Notice: Subject to any disclaimer, the term of this patent is extended or adjusted under 35 U.S.C. 154(b) by 0 days.

(21) Appl. No.: 09/172,847

(22) Filed: Oct. 15, 1998

(51) Int. Cl.[7] .................................................... G06F 17/00
(52) U.S. Cl. .............................. 705/36; 705/35; 705/10; 705/37; 705/46; 705/42
(58) Field of Search ................................ 705/36, 35, 10, 705/1, 42, 37, 38, 54, 40; 707/1

(56) References Cited

U.S. PATENT DOCUMENTS

| | | |
|---|---|---|
| 4,656,603 | 4/1987 | Dunn . |
| 4,937,743 | 6/1990 | Rassman et al. . |
| 4,953,085 | 8/1990 | Atkins ................................. 364/408 |
| 5,021,976 | 6/1991 | Wexelblat et al. . |
| 5,291,587 | 3/1994 | Kodosky et al. . |
| 5,301,301 | 4/1994 | Kodosky et al. . |
| 5,313,575 | 5/1994 | Beethe . |
| 5,317,504 * | 5/1994 | Nakayama ........................... 364/406 |
| 5,370,466 * | 12/1994 | Kimura ................................. 400/78 |
| 5,388,203 | 2/1995 | Kaneko . |
| 5,390,113 * | 2/1995 | Sampson .......................... 364/419.19 |

(List continued on next page.)

OTHER PUBLICATIONS

Object design's ObjectStore Deployed in Ultraprise Internet Mortgage . . . ; Business Wire, Apr. 6, 1999.*

Burch, John; TheCase for Object–Oriented Financial Systems Development; Financial & Accounting Systems; p.35–40, Sum. 1991.*

Tallent, Barbara; Intervista annou8nces production release of WorldView 2.0 VRML . . . ;Business Wire, May 5, 1997.*

Hayes, Frank; IBM And PeerLogic To Connect Pipes To System Object Model; Open Systems Today; p4, Feb. 20, 1995.*

Stahl, Stephanie; IBM In Middleware Deal—Teams with PeerLogic . . . ; Informationweek, p33, Feb. 27, 1995.*

Tebbe, Mark; A mighty tight squeeze: Distributing objects and data through T1 pipes; InfoWord, v19, n19; p104, May 12, 1997.*

IBM; The System Object Model (SOM) and the Component Object Model (COM), Object Technology Products Group; Austin, TX, Jul. 7, 1994.*

IBM; SOMobjects for MVS: User's Guide; Version 1; Release 1; Program No. 5696–822; File No. s370/s390–79, 1995.*

Chu, Pai–Cheng; Applying Object–Oriented Concepts to Developing Financial Systems; Journal of Systems Management, v43; n5; p28, May 1992.*

(List continued on next page.)

Primary Examiner—Robert W. Downs
Assistant Examiner—Pedro R. Kauol
(74) Attorney, Agent, or Firm—Jagtiani & Associates

(57) ABSTRACT

A method implemented in a computer system for dynamically analyzing the status of a numeric system wherein the numeric system which includes one or more numeric objects such as inflow objects, outflow objects, account objects, variable objects, and pipe objects. The present invention also provides numeric objects having a growth property. In addition the present invention provides single icons which represent either a row or column of a spredsheet.

186 Claims, 6 Drawing Sheets

U.S. PATENT DOCUMENTS

| | | |
|---|---|---|
| 5,437,006 | 7/1995 | Turski . |
| 5,471,575 | 11/1995 | Giansante . |
| 5,481,665 | 1/1996 | Okada et al. . |
| 5,481,741 | 1/1996 | McKaskle et al. . |
| 5,485,600 | 1/1996 | Joseph et al. . |
| 5,487,144 | 1/1996 | Takahashi et al. . |
| 5,490,246 | 2/1996 | Brotsky et al. . |
| 5,504,854 | 4/1996 | Yamashita . |
| 5,576,946 | 11/1996 | Bender et al. . |
| 5,590,037 * | 12/1996 | Ryan et al. ............................ 395/204 |
| 5,619,638 | 4/1997 | Duggan et al. . |
| 5,642,490 | 6/1997 | Morgan et al. . |
| 5,644,727 | 7/1997 | Atkins .................................. 395/240 |
| 5,675,756 * | 10/1997 | Benton et al. ....................... 395/349 |
| 5,701,400 * | 12/1997 | Amado .................................. 395/76 |
| 5,727,161 | 3/1998 | Purcell, Jr. . |
| 5,740,427 * | 4/1998 | Stoller .................................. 395/615 |
| 5,774,878 * | 6/1998 | Marshall ................................ 705/35 |
| 5,826,258 * | 10/1998 | Doktor ..................................... 707/4 |
| 5,852,811 * | 12/1998 | Atkins .................................... 705/36 |
| 5,875,437 * | 2/1999 | Atkins .................................... 705/40 |
| 5,884,283 | 3/1999 | Manos .................................... 705/30 |
| 5,884,285 | 3/1999 | Atkins .................................... 705/36 |
| 5,898,154 * | 4/1999 | Rosen ................................... 235/379 |
| 5,911,135 | 6/1999 | Atkins .................................... 705/36 |
| 5,911,136 | 6/1999 | Atkins .................................... 705/36 |
| 5,918,217 | 6/1999 | Maggioncalda et al. ............. 705/36 |
| 5,982,891 * | 11/1999 | Ginter et al. ............................. 380/4 |
| 5,991,751 * | 11/1999 | Rivette et al. ........................... 707/1 |
| 6,012,044 | 1/2000 | Maggioncalda et al. ............. 705/36 |
| 6,021,397 | 2/2000 | Jones et al. ............................ 705/36 |
| 6,023,684 * | 2/2000 | Pearson ................................. 705/35 |
| 6,125,355 | 9/2000 | Bekaert et al. ....................... 705/36 |

OTHER PUBLICATIONS

Steinborn, Deborah; Immersed in the object; Bank Systems + Technology; v30; n6; p38, Jun. 1993.*

Jones, David; Software: Vendors turn to object–oriented programming; Financial Technology International Bulletin; v10; n8; p11–12, Apr. 1993.*

Liao, S.Y.; Shao, Y. P.; Tsang, W.H.; Experience Report: SSADM–Designed System to Object–Oriented Sytem; The Journal of Object–Oriented Programming, v10; n9; Feb. 1998.*

Watterson, Karen; When it comes to choosing a database, the object is value (object–oriented DBMSs); Datamation; v44; n1, Dec. 1, 1997.*

News update.(HP introduces HP Changengine electronic commerce middleware); Insurance & Technology, Jan. 1, 1998.*

Stirland, Sara; ActiveX vs. Java (includes related article on the programming languages' security concerns); v15; n8, Apr. 6, 1999.*

Microsoft Press, "Computer Dictionary", Third Edition, 1997, Incomplete.*

Edel, Mark, "The Tinkertoy Graphical Programming Environment" IEEE Transactions on Software Engineering, vol. 14, No. 8, Aug. 1988.

Borg, Kjell, "Visual Programming and UNIX," The HEID studio, Department of Computer Science, University of Umeå, Sweden.

Hirakawa, M., Iwata, S., Tahara, Y., Tanaka, M., and Ichikawa, T., "A Framework for Construction of Icon Systems," Information Systems, Faculty of Engineering, Hiroshima University, Shitami, Saijo–cho, Higashi–Hiroshima 724 Japan.

* cited by examiner

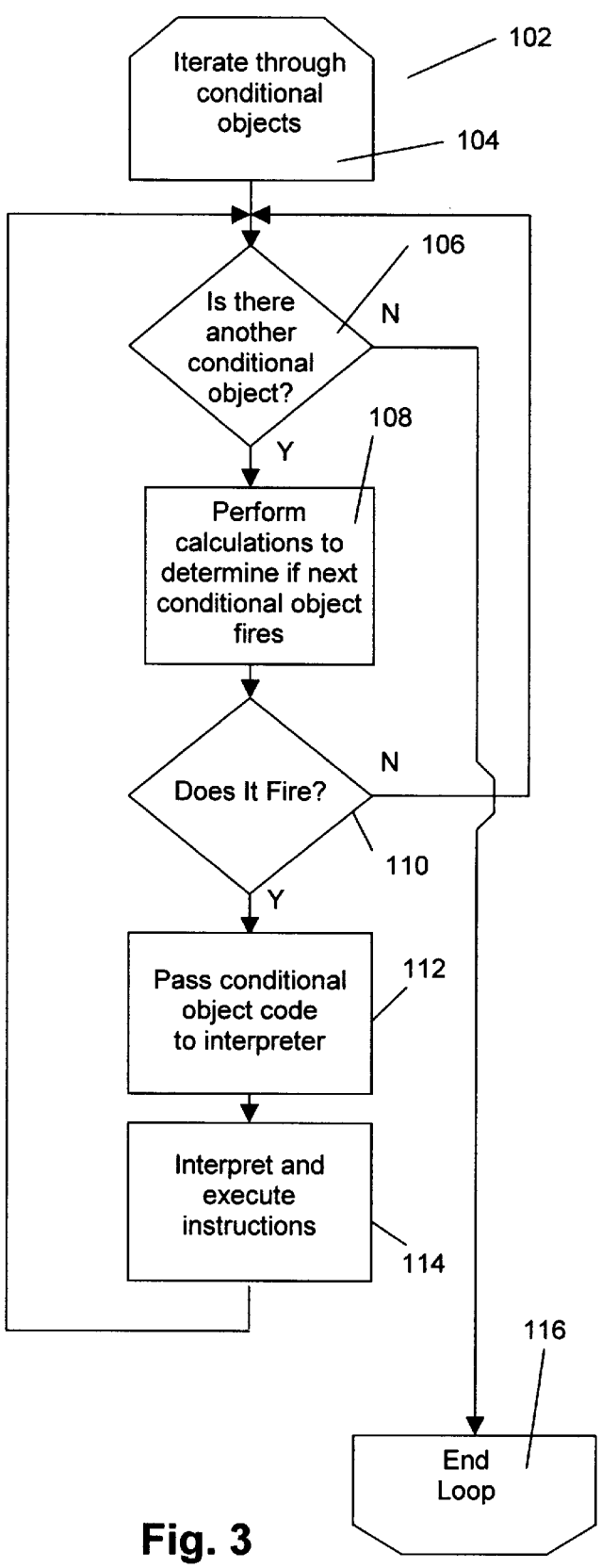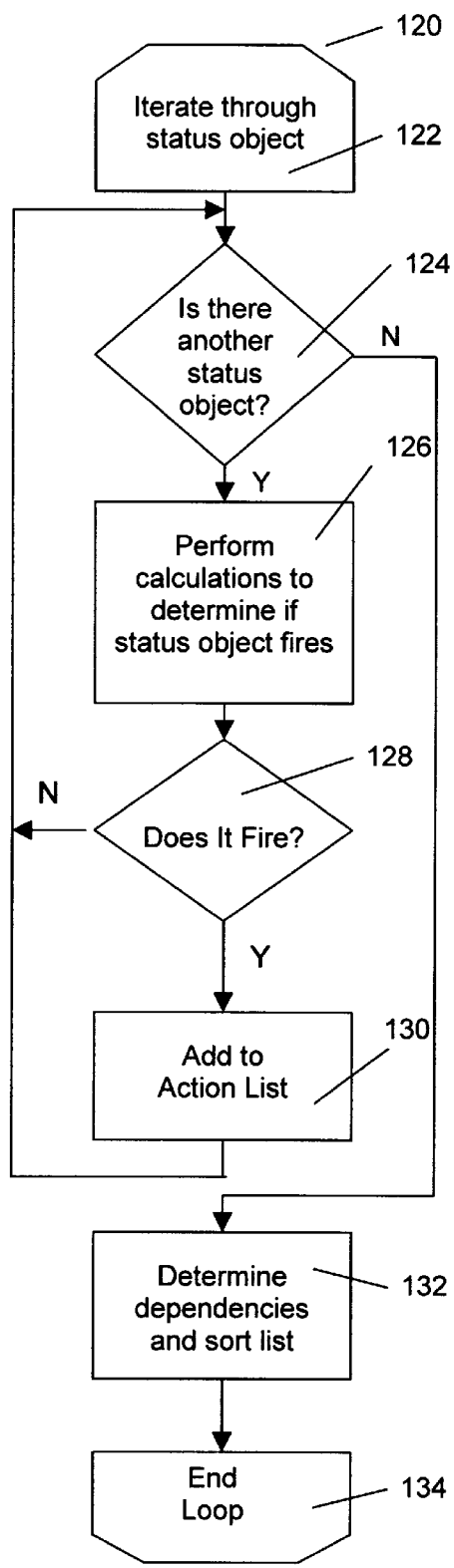
Fig. 3
Fig. 4

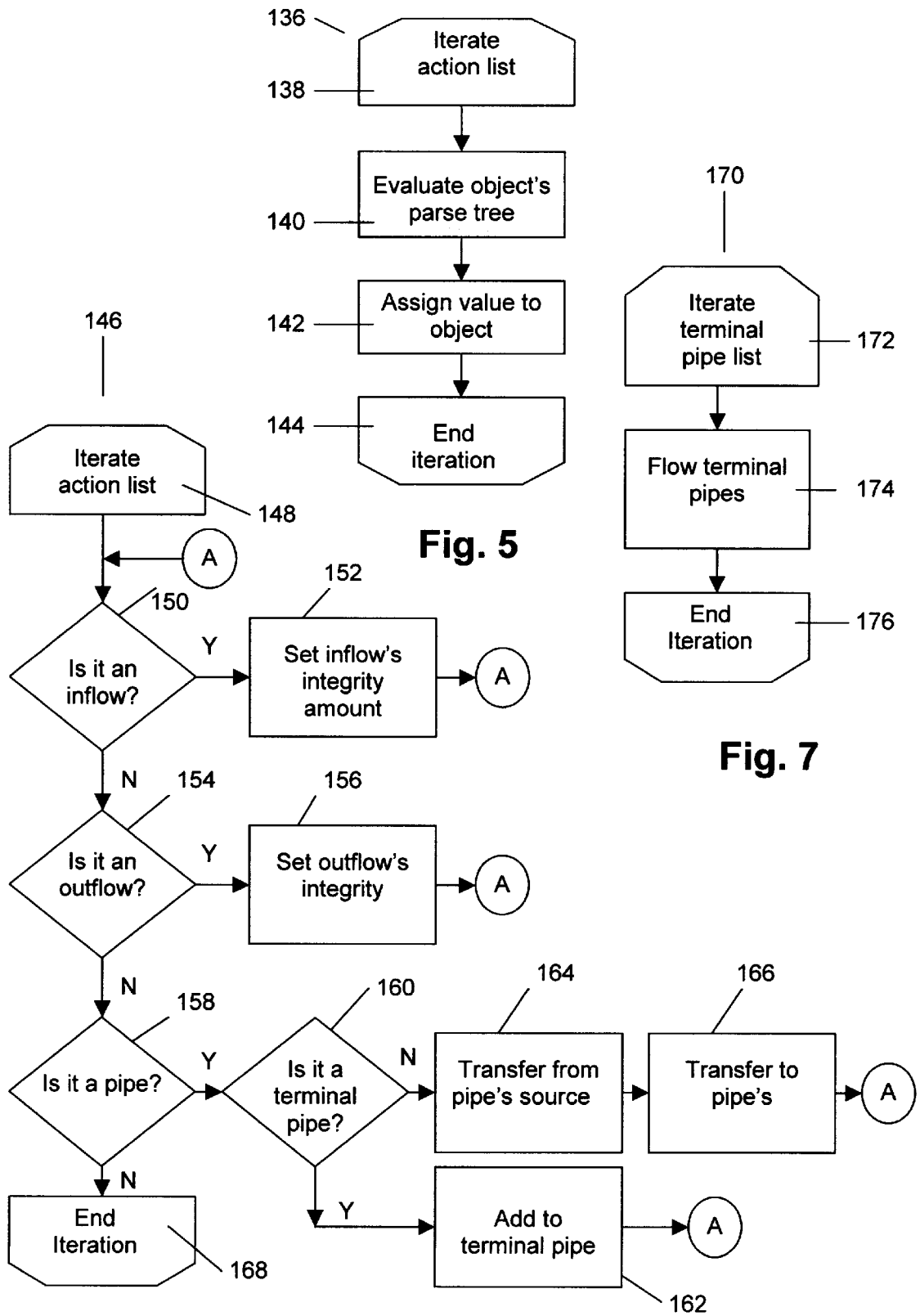

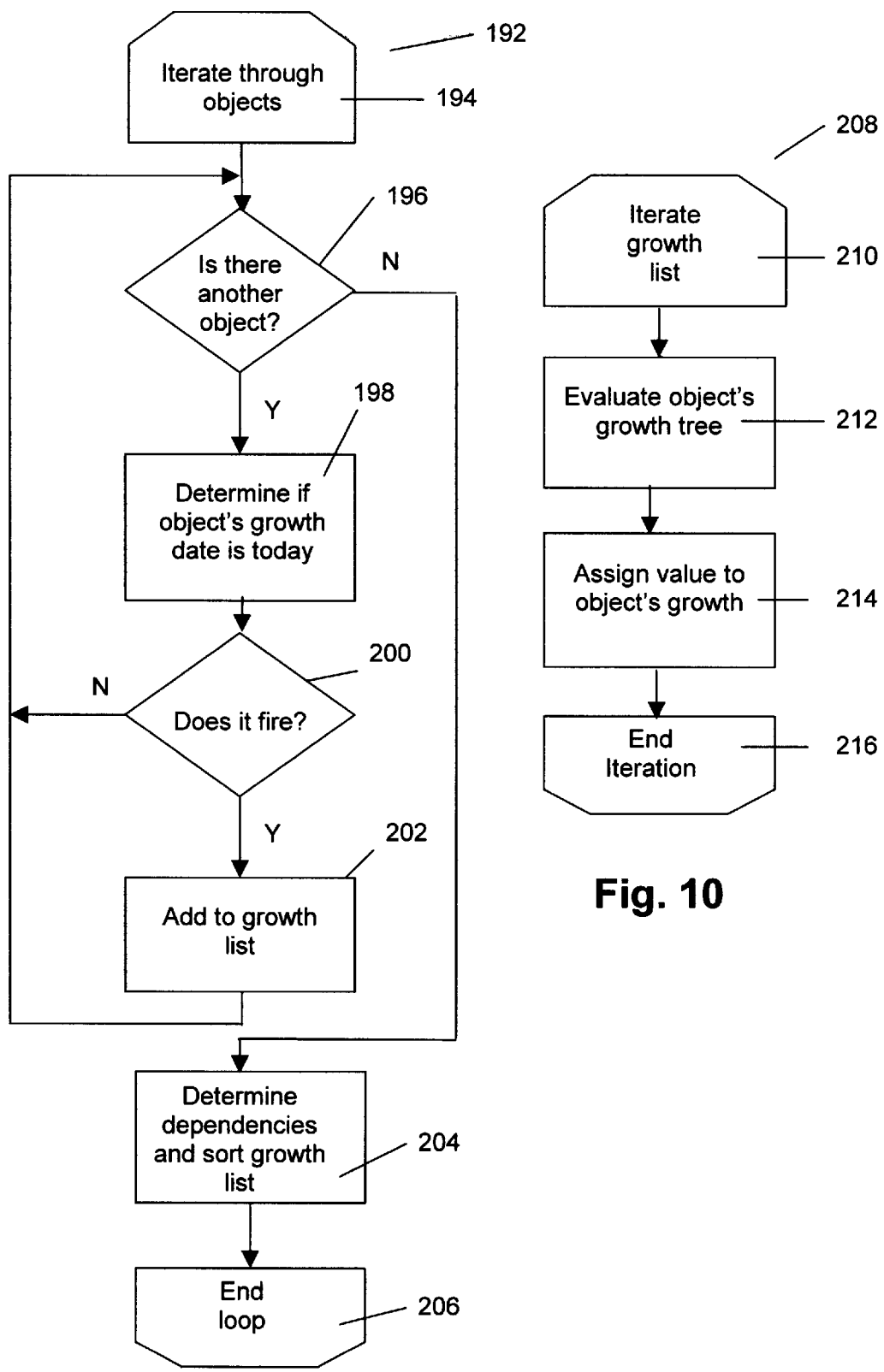

OBJECT-BASED NUMERIC-ANALYSIS ENGINE

BACKGROUND OF THE INVENTION

1. Field of the Invention

The present invention relates generally to generating and displaying the status of a numeric system.

2. Description of the Prior Art

A problem with current financial planning software for both individuals and businesses is that they do not display the financial status of a person or business in a way that is easy to use and understand. For example, conventional spreadsheet displays can show numerical values for an individual's income, assets, liabilities, accounts and expenses, but do not do a good job of showing how these items are related. When a person changes one of these values, either by inputting a hypothetical value, adjusting a tax rate, adjusting an interest rate, etc. the spreadsheet will display new results for these items but does not allow a user to see what specific factors caused the new results. Even displaying results using bar graphs or pie charts which are more visually appealing do not solve this problem, because such graphs and charts, like a spreadsheet display, do not visually show the relationship between different items. Generally, all that the graphs and charts can do is show how income or expenses are divided up and not how changes in income and expenses affect the values of bank accounts or tax liabilities.

Existing spreadsheets also have difficulty in showing how, the status of a numeric system, such as a household budget or a business budget or inventory varies over time. For example, a typical spreadsheet program requires that a separate spreadsheet be set up for each individual time period for which a user wishes to see the status of a household or business budget. Therefore, a conventional spreadsheet only allows a user to see a snapshot of a numeric system, such as a budget at certain fixed periods of time, unless a user, creates a spreadsheet for each individual day a cumbersome process. With a conventional spreadsheet program, a user cannot simply enter a time period, such as three days in the future, and have the spreadsheet calculate the values of all of the items in a household budget or a business financial plan, if an individual spreadsheet has not been previously created for the desired day. Therefore, conventional spreadsheet programs only provide fixed periodic information on the status of a numeric system and do not allow for the dynamic analysis of numeric systems.

SUMMARY OF THE INVENTION

It is therefore an object of the present invention to provide a method for dynamically analyzing a numeric system.

It is another object of the present invention to provide visual display of the financial status, actual or hypothetical of an individual, household or business which is easy to use and simple to understand.

It is another object of the invention to provide a visual display of financial status, actual or hypothetical, of an individual, household or business which visually shows the relationship between income, expenses, tax rates, interest rates and savings.

According to one aspect of the present invention, there is provided a method implemented in a computer system for dynamically generating the status of a numeric system comprising the steps of: generating at least one first inflow object having an initial value and properties: generating at least one first account object having an initial value and properties; generating at least one first pipe object which defines a first mathematical relationship between the at least one inflow object and the at least one first account object; generating an adjusted value for the first inflow object based on at least one member of the group consisting of the first inflow object initial value, the first inflow object properties the first account object initial value the first account object properties and the first mathematical relationship; and generating an adjusted value for the first account object based on at least one member of the group consisting of the first inflow object initial value, the fist inflow object properties, the first account object initial value, the first account object properties, and the first mathematical relationship.

According to a second aspect of the present invention, there is provided a method implemented in a computer system for dynamically generating the status of a numeric system comprising the steps of: generating at least one first account object having an initial value and properties; generating at least one first outflow object having an initial value and properties; generating at least one first pipe object which defines a first mathematical relationship between the at least one account object and the at least one first outflow object; generating an adjusted value for the first account object based on at least one member of the group consisting of the first account object initial value, the first account object properties the first outflow object initial value, the first outflow object properties, and the first mathematical relationship; and generating an adjusted value for the first outflow object based on at least one member of the group consisting of the first account object initial value, the first account object properties the first outflow object initial value, the first outflow object properties, and the first mathematical relationship.

According to a third aspect of the present inventional, there is provided a method implemented in a computer system for dynamically generating the status of a numeric system comprising the steps of generating at least one first inflow object having an initial value and properties, generating at least one first outflow object having an initial value and properties; generating at least one first pipe object which defines a first mathematical relationship between the at least one inflow object and the at least one first outflow object; generating an adjusted value for the first inflows object based on at least one member of the group consisting of the first inflow object initial value, the first inflow object properties, the first outflow object initial value, the first outflow object properties, and the first mathematical relationship; and generating an adjusted value for the first outflow object based on at least one member of the group consisting of the first inflow object initial value, the first inflow object properties, the first outflow object initial value, the first outflow object properties, and the first mathematical relationship.

According to a fourth aspect of the present invention there is provided a method implemented in a computer system for dynamically generating the status of a numeric system comprising the steps of: generating at least one first account object having an initial value and properties; generating at least one second account object having an initial value and properties; generating at least one first pipe object which defines a first mathematical relationship between the at least one first account object and the at least one second account object; generating an adjusted value for the first account object based on at least one member of the group consisting of the first account object initial value, the first account object properties, the second account object initial value, the second account object properties, and the first mathematical relationship; and generating an adjusted value for the second account object based on at least one member of the group consisting of the first account object initial value, the first account object properties, the second account object initial value, the second account object properties, and the first mathematical relationship.

According to a fifth aspect of the present invention there is provided a numeric object having a growth property implemented in a computer system.

According, to a sixth aspect of the present invention there is provided a single numeric object comprising a column of cells of a spreadsheet.

According to a seventh aspect of the present invention there is provided a single numeric object comprising a row of cells of a spreadsheet.

According to an eighth aspect of the present invention there is provided a method implemented in a computer system for dynamically generating the status of a numeric system comprising the steps of: generating at least one first numeric object having an initial value and properties; generating at least one first conditional object; and generating an adjusted value for the first numeric object based on at least one member of the group consisting of the first numeric object initial value and the first numeric object properties when the at least one first conditional object fires.

BRIEF DESCRIPTION OF THE DRAWINGS

The invention will be described in conjunction with the accompanying drawings in which:

FIG. 3 is a flow chart of a sub-engine of a numeric analysis engine of the present invention for processing conditional objects, FIG. 4 is a flow chart of a sub-engine of a numeric analysis engine of the present invention for processing status objects;

FIG. 5 is a flow chart of a sub-engine of a numeric analysis engine of the present invention for assigning a value to a numeric object;

FIG. 6 is a flow chart of a sub-engine of a numeric analysis engine of the present invention for transferring value between numeric objects.

FIG. 7 is a flow chart of a sub-engine of a numeric analysis engine of the present invention for transferring value between numeric objects using dependent pipes.

FIG. 9 is a flow chart of a sub-engine of a numeric analysis engine of the present invention for creating and ordering an action lists of numeric objects which are to grow; and FIG. 10 is a flow chart of a sub-engine of a numeric analysis engine of the present invention for evaluating the growth expressions for numeric objects.

DETAILED DESCRIPTION OF THE PREFERRED EMBODIMENT

Definitions

Figure 1:
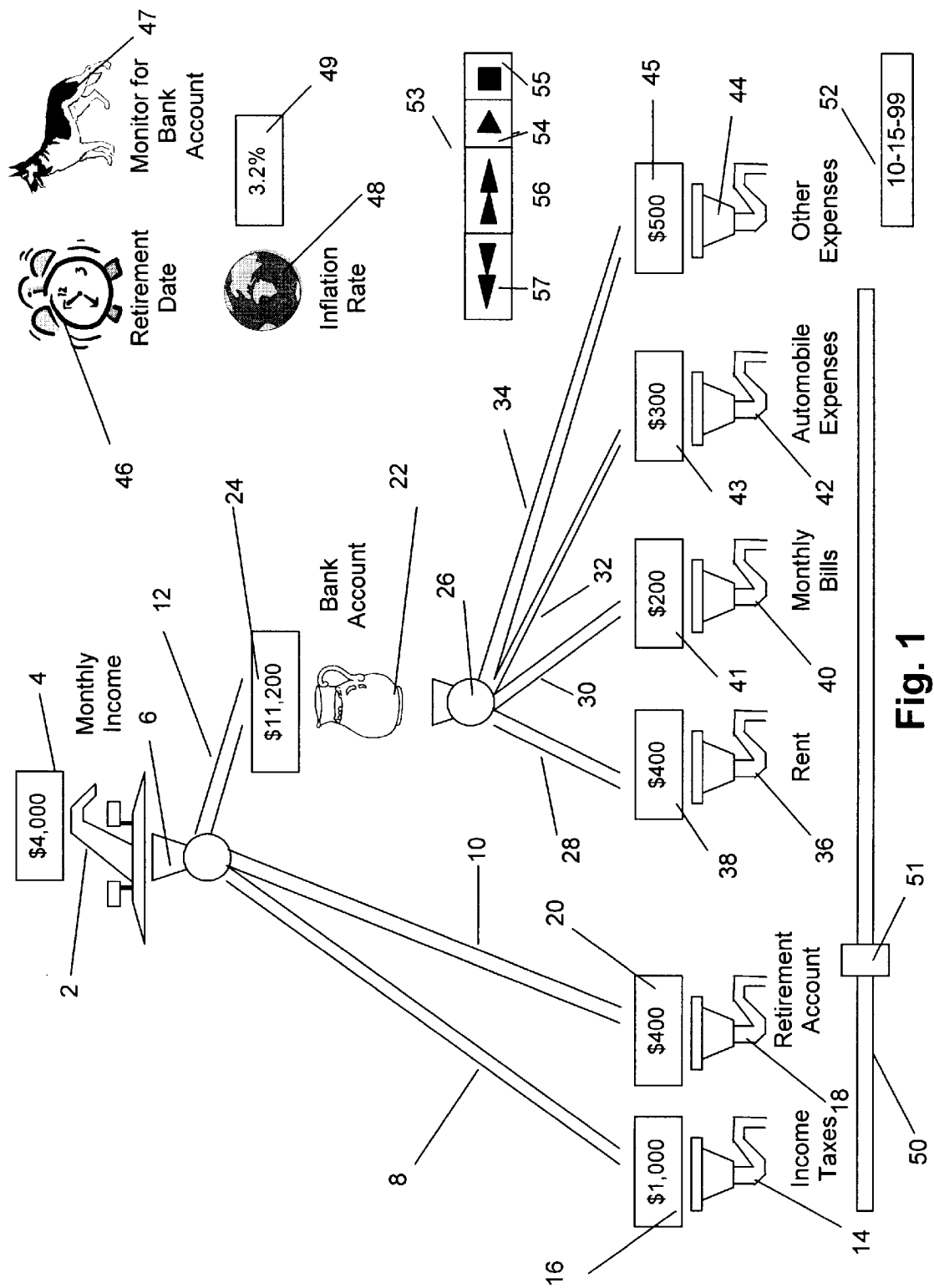
FIG. 1 illustrates an iconographic display generated by a numeric analysis engine of the present invention for a household budget.

For the purposes of the present invention, the term "computer system" refers to any type of computer system including an individual computer such as a personal computer. mainframe computer, mini-computer, etc. or a network of computers, such as a network of computers in a business, the Internet, etc.

For the purposes of the present invention, the term "entity" refers to, but not limited to, an individual, a household, a business, etc. whose status, either actual or hypothetical, is displayed using the iconographic display system of the present invention.

For the purposes of the present invention, the term "visual display apparatus" includes apparatuses for displaying information such as, but not limited to, computer monitors, LCD displays, LED displays, television displays, etc.

For the purposes of the present invention term "numeric object" refers to an object generated by a computer program which includes a value and can include one or more properties. Examples of numeric objects include, but not limited to, inflow objects, account objects, outflow objects, variable objects, pipe objects, monitor objects and event objects. Numeric objects can either be hidden or visually displayed as icons on boxes.

For the purposes of the present invention, the term "value" of a numeric object refers to the numeric value of a numeric object. The value of a numeric object can be a number, a monetary amount, a number of goods, amount of raw material, a value of services, etc. The value of a numeric object can be input by the user or be calculated based on the relationships among numeric objects in the numeric system of the present invention or when an event object fires or through a query to a data source.

For the purposes of the present invention, the term "properties" of a numeric object refers to one or more properties associated with the numeric object. For example, the interest rate of an account object is a property of the account object. The fact that a federal tax outflow object is paid on April 15 of each year is a property of that object. That a particular outflows object requires the use of money order is a property of that object. There are numerous types of properties which can be associated with a numeric object.

For the purposes of the present invention, the term "expression" refers to one or more mathematical formulas used in determining an adjusted value for a numeric object. For example, if the monthly income for an individual is $4000, the income tax rate is 25%, the amount to be transferred to a retirement account is 10% of monthly income, and the remaining amount of monthly income is to be transferred to a bank account the expression for the amount of value to be added to the bank account is:

Salary [$4000]×(1−(Tax Rate [0.25]+Retirement Account Rate [0.10])

In this case, the above expression would have the effect of adding $2600 to the adjusted valued of the bank account. Generally the term "expression" refers to a mathematical formula governing the value of a status object such as a pipe.

For the purposes of the present invention, the term "growth" refers to adjusting the value of a numeric object without transferring value by a pipe object. One example of growth is a bank account which adds value based on the value of the bank account and the interest rate for the bank account.

For the purposes of the present invention, a value or property is "dependent" or "based" on a particular value, property, the satisfaction of a condition, or other factor, if that value is derived by performing a mathematical calculation or logical decision using that value, property or other factor. For example, when the numerical invention of the present invention represents a household budget, the adjusted value of the account object "bank account" can be "dependent" or "based" on the value of an income inflow object, the value of a income tax outflow object, the initial value of the hank account object, an interest rate property of the bank account object, and a condition being met, i.e., the last day of the month occurring and thus causing the bank account object to accrue interest. Similarly, the interest rate property itself is "based" on a time dependent condition, i.e., the last da) of the month occurring. For the purposes of the present invention, objects, values, and properties which are dependent on a time based condition being met are referred to as being time dependent.

For the purposes of the present invention, the term "inflow object" or "inflow" refers to a numeric object representing an inflow of value into the numeric system of the present invention. Examples of inflow objects are, but not limited to, objects relating to the income received by an individual, a household or business. Inflow objects can also relate to non-monetary inflows such as goods received by a business, the number of labor hours available to a business, the amount of raw material received by a business, etc. For inflow objects, the associated inflow box can represent the initial value of the inflow object, the adjusted value of the inflow object, or both the initial and actual value of the inflow object. For example, when the numeric system of the present invention represents an individual's budget, the inflow box representing the person's income can display the initial value of the income box (before taxes) and/or the adjusted value of the income box (after taxes). The initial value for an inflow box can be input by a user or calculated. For example, if an individual is to receive a raise of 10% to their previous monthly salary of $4000 per month effective the first day of the year, when the first day of the year occurs, $400 is added to the preliminary value of $4000 for the inflow "monthly income" to provide an initial value of $4400 for monthly income for the remaining months of the year.

For the purposes of the present invention, the term "outflow object" or "outflow" refers to numeric objects representing an outflow of value from the numeric system of the present invention. When the numeric system of the present invention represents a household budget, outflow objects can represent such things as expenses, taxes, rent payments, utility bills, food, movie tickets, etc. In a business, outflow objects can represent such things as goods which are delivered, labor hours used, airline seats sold, etc.

For the purposes of the present invention, the tern "account object'or "account" refers to a numeric object representing a value which is held or owed by the numeric system of the present invention. For example, when the numeric system of the present invention represents a household budget, account objects can include, but not limited to, such items as checking accounts, bonds, loans, mortgages, etc. When the numeric system of the present invention represents a business, they can include such items as inventory, available manpower hours left after allocation, the total manpower of a business to existing projects, unsold theater seats, etc.

For the purposes of the present invention the term "pipe object" or "pipe" refers to a computer program which defines a mathematical relationship between two numeric objects. For example in a household budgets, a pipe object connecting the inflow object personal income to the outflow object federal income taxes can cause the value in the federal income taxes object to increase in value based on the value of the income inflow object and the federal tax rate for that income. A "source object" for a pipe is a numeric object connected to a pipe from which value is transferred by the pipe. A "destination object" for a pipe is an object to which value is transferred by the pipe.

For the purposes of the present invention? the term variable object" or "variable" refers to a numeric object which has a constant value or a value calculated from a mathematical expression. Unlike most inflow objects, outflow objects, account objects, the value of a variable object is not generally transferred, either in total or in part, to another numeric object by a pipe. Instead, the value of a variable object is generally used in the process of calculating adjustments to the value of numeric objects due to growth or due to transfers between numeric objects by pipes. Variable objects can be used to keep track of such things as the annual inflation rate, the Prime Rate for banks, income tax rates, etc. For example, an variable object can be used to keep track of a cost of living index that is used to adjust an individual's monthly salary.

For the purposes of the present invention, the term "event object" or "event" refers to a numeric object which is activated i.e. provides instructions to one or more numeric objects when a time-based condition is met. Events generally have the properties of: frequency, time or date of firing, and actions to be taken. Examples of frequencies are: once, daily, weekly, monthly, semi-annually, annually, etc. Examples of time or date of firing are: first day of month, $15^{th}$ day of month, last day of month, Jan. 17, 1999. etc. Examples of instructions are: increase bank account object value by the bank account interest rate, increase income inflow object value based on cost-of-living adjustment, change income inflow object value to retirement income value, etc. Therefore, an event for accruing interest for a bank account object can have a frequency of "monthly," a day of occurence of the "$15^{th}$ day of the month," and an action of "increase the bank account object value by the bank account interest rate". An example of an event in a household budget system is an individual's retirement.

For the purposes of the present invention, the "monitor objects" or "monitors" are objects which is activated i.e. provides instructions to one or more numeric objects, when non-time-based conditions, such as logical conditions, are met. For example, when the numeric system is a household budget, when the value of an account object for a bank account reaches a particular minimum balance necessary to avoid bank fees, the condition for a monitor object can be met within the numeric system which prevents an inflow object connected to the account by a pipe object from adding any additional money to the account. Another example of a condition being met for a monitor object is the addition of value to an outflow object for bank fees when the number of checks recorded in the household budget exceeds a specified number. Yet another example of a condition for a monitor being met is the interest rate property for a first bank account object being greater than the interest rate property for a second bank account object for an entity causing any left over value from an income object to be added to the first bank account object value as opposed to the second bank account object value. The fact that a liven outflow object is or will be paid using a money order can be one of the properties of the outflow object.

For the purposes of the present invention, the terms "mathematical relationship" and "instructions" refer to how a first numeric object affects the properties or values of a second numeric object. For example, when the numeric system of the present invention represents a household budget, the mathematical relationship between an income inflow object and a federal income tax outflow object can be: multiply the initial value of the income inflow object by the appropriate tax rate to arrive at the value of the federal income tax outflow object and subtract the value of the federal income tax outflow object from the initial value of the income inflow object to provide an adjusted value for the income inflow object. Although the above are relatively simple examples only involving multiplication and subtraction, the mathematical relationship can be, if desired, more complicated and include logical statements, loops, subroutines, etc. of the type found in typical computer programs or financial analysis systems.

For the purposes of the present invention, the term "status objects" refers to inflow objects, account objects, outflow objects, variable objects and pipe objects.

For the purposes of the present invention, the term "conditional objects" refers to monitor objects and event objects.

For the purposes of the present invention, the term "numeric object icon" refers to the visual display of an icon representing a numeric object. For the purposes of the present invention, an icon can be either "passive" or "active". For the purposes of the present invention "passive icon" refers to an icon which cannot be activated, such as by double-clicking on the icon in Microsoft Windows®, to allow a user to change the properties of the numeric object the icon represents. For the purposes of the present invention, "active icons" refers icons which can be activated by a user to allow the user to change the properties of the numeric object the icon represents.

For the purposes of the present invention, icons can be either "individual icons" or "group icons". For the purposes of the present invention, the term "individual icon" refer to icons which represent a single numeric object. For the purposes of the present invention "group icon" refers to icons which represent multiple numeric objects. For example, when the numerical system of the present invention represents a household budget, a "household income" group icon can represent two or more individual income "individual icons. Group icons can be expanded, extracted, collapsed, inspected, added, combined, etc by a user as is typically done with folder icons in windows-based computer operating systems. Group icons can also contain other group icons which allow for hierarchical relationships in a numeric system to be displayed.

For the purposes of the present invention, group icons can be either "homogenous" or "heterogeneous." For the purposes of the present invention, the term "homogenous group icon" refers to group icons which represent a single type of numeric object: two or more inflow objects, two or more account objects, two or more outflow objects, two or more variables, etc. The above example of "household income" icon representing two individual income icons is an example of a homogeneous group icon. Another example of a homogenous group icon is a "household expenses" icon which represent a number of different outflow, object icon is such as: rent, telephone bill, food, etc,. For the purposes of the present invention, the term "heterogeneous group icon" refers to an icon which represents more than one type of numeric object. For example, when the numeric system of the present invention is used for a business plan, each division of a business can be represented by a heterogeneous group icon, leach heterogeneous 'department" icon can then represent all of the various inflow objects, outflow objects, account objects and pipe objects for that department. For example, there can be a heterogeneous group icon for the public relations department, a heterogeneous group icon for the technical support department, a heterogeneous group icon for the manufacturing department, etc.

For the purposes of the present invention, the term "numeric object box" refers to a visual display of the value, either adjusted or initial, of a numeric object, value entered in a numeric object box can be entered by the user, a fixed amount, or an amount calculated based on the values of numeric objects which are part of the numeric system of the present invention. A numeric object box can include icons as opposed to numbers to represent a value. For example, the number of human stick figure shaped icons in a numeric object box can represent the number of workers available to a business.

For the purpose of the present invention, the term "icon/box" refers to a graphical image and/or an enclosed area which represents a numeric object on a visual display apparatus.

For the purposes of the present invention, the term "pipe object icon" or "pipe icon" refers to an icon representing one or more pipe objects. The term "pipe object icon" refers not to only icons which physically link two icons on a display, but to icons such as lines, arrows. and symbols such as pipes which visually indicate that two icons (and their associated objects) are related to each other. A pipe object icon can also be visually part of either or both of the icons being linked. For example, either or both of a pair of linked icons can include arrows which point from one icon to the other member of the pair. However, functionally the pipe object representing by the pipe object icon would be separate from the numeric objects it connects, even if visually the pipe object icon appears to be part of either one or both of the two linked icons. A pipe object icon can also represent two or more pipe object icons and their associated pipe objects. For example, on visual display of the household budget, an income object icon and a bank account object icon can appeal to be linked by a single pipe object icon. When a user executes a command for a pipe object icon, the icon can split into two pipe object icons, one icon indicating money paid into the bank account and another indicating interest from the bank account which is added to the household's income.

For the purposes of the present invention, the term "semaphore" refers to a synchronization object that manages multiple threads in a computer program. Because in the numeric analysis engine of the present invention, a stop, pause or reset action can occur while a numeric analysis thread is running, the numeric analysis engine can include sub-routines which check the semaphores in the analysis thread, for example at the beginning of each day.

For the purposes of the present invention, the term "spreadsheet cell" refers both to the value displayed in a computerized spreadsheet cell or any underlying mathematical calculation associated with the displayed value of the cell.

For the purposes of the present invention, the term "spreadsheet row" 'refers to a row of cells in a conventional computerized spreadsheet.

For the purposes of the present invention, the term "spreadsheet column" refers to a column of cells in a conventional computerized spreadsheet.

Description

With reference to the Figures, wherein like reference characters indicate like elements throughout the several views and, in particular, with reference to FIG. 1, which illustrates how the numeric system of the present invention can be used to create an iconographic display of a household budget, a preferred embodiment of the invention is illustrated. An inflow object icon 2 represents monthly income, the value of which is displayed in numeric form in an inflow object box 4, coming into a household, Although the inflow object icon 2 in FIG. 1 is shaped like faucet, inflow object icons can be any convenient shape or color. A funnel 6 and pipe object icons 8, 10, and 12 represent the household income flowing into three initial places: income taxes, represented by an outflow object icon 14 and an outflow box 16: a retirement account, represented by an outflow object icon 18 and an outflow object box 20; and a bank account, represented by an account object icon 22 and an account object box 24. Although the outflow object icon 18 is shaped like a drain and the account object icon is shaped like a pitcher n FIG. 1, outflow object icons and account object icons can be any convenient shape or color. From a budget standpoint, money from household income is first allocated to a before taxes retirement account. Next, based on the household's monthly taxable income, the household's income is allocated to taxes, calculated based on the household's income tax rate. After the retirement account amount and taxes amount has been subtracted from monthly income, any remaining portion of the household's monthly income is added to any existing balance in the household's bank account to provide an initial bank account amount (not shown) which can be allocated to the household's expenses, in the alternative the retirement amount can be withdrawn from the bank account after adding the income as discussed below. The flow of money from the household's bank account to the household expenses is shown by a funnel 26 and pipes 28, 30, 32 and 34. The expenses themselves are represented by an outflow object icon 36 and an outflow box 38 for rent; an outflow object icon 40 and an outflow box 41 for monthly bills; an outflow object icon 42 and an outflow box 43 for automobile expenses; and an outflow object icon 44 and an outflow box 45. The amount of money displayed in box 24 for the bank account is calculated by subtracting from the initial bank account amount the amounts shown in outflow boxes 38, 41, 43 and 45.

Also shown in FIG. 1 is an event object icon 46 for an individual's retirement date. The presence of the event object icon 46 indicates to the user that at least one of the numeric objects in the household budget is affected by the individual's retirement date occurring By inspecting an event object icon 46. Such as by double clicking on it with a mouse in a windows-based operating system, a user can find out which objects are affected by an individual's retirement date occuring, and can edit the objects effected by the individual's retirement date occurring, Although the event object icon 46 in FIG. 1 is shaped like an alarm clock, event object icons can be any convenient shape or color. Although in the display shown in FIG. 1, the event object is represented on a computer screen by an individual icon, an event can also be incorporated into the numeric objects affected by the event. When the present invention is used with a windows-type operating system, events can also be accessed by providing an entry for events in a pull-down menu (not shown) which allows a user to see how given events affect numeric objects of the household budget. Event and monitor object icons can be grouped together in a group icon.

FIG. 1 also shows a monitor object icon 47 which represents a monitor object that keeps track of the balance in the bank account object. When the bank account value falls below a particular amount, the monitor object represented by monitor object icon 47 can provide a warning to a user by a pop-up warning, or other means, that the value of the bank account object has fallen below a critical amount set by the user or the system. Although the monitor object icon is shown as being watchdog shaped, monitor object icons can be any convenient shape or color. Also, like event objects, monitor objects can be incorporated into other numeric objects and can be accessed and edited through the use of a pull-down menu or any other means known in the computer art.

FIG. 1 also shows a variable object icon 48 which represents a variable object for the annual rate of inflation on the day that the status of the household budget is being viewed. Although the variable object icon 48 is shown as being shaped like a globe, variable object icons can be any convenient shape or color. The rate of inflation is depicted in variable object box 49 and can be entered by the user. Based on the value of the inflation rate, the values of various numeric objects such as the inflow objects, account objects and outflow objects in the household budget can be changed automatically by the numeric analysis engine of the present invention. For example, an increase in the inflation rate can trigger an increase in the value of income due to a cost of living adjustment that an individual receives or can cause the value for monthly rent to increase during the next year if the value for rent is tied to inflation.

FIG. 1 also shows a slider bar 50 which allows a user in a windows-based operating system to move an indicator 51 along slider bar 50 to see how the status of the household budget dynamically varies over time. The date that the indicator 51 has been moved to is shown in date box 52. Although only one type of slider bar 50 is illustrated in FIG. 1, any type of slider bar, such as the slider bars used in Microsoft Windows® and Windows NT®, can be used with the present invention to allow a user to display the status of the numeric system being displayed. In conjunction with the slider bar, the display for the numeric analysis system of the present invention, can use a set of virtual tape recorder buttons 53 of the type used in Microsoft Windows® to allow a user to play a compact disk in a computer. For example, when a user presses the play button 54 by clicking on button 54 with a mouse, the indicator 51 proceeds along the slider bar 50 and the date box 52 shows increasing dates. When the indicator 51 reaches the desired date, the user can stop the indicator 51 from moving by pressing the virtual stop button 55. By pressing virtual fast forward button 56, a user can move indicator 51 rapidly to the right and by pressing virtual rewind button 57 a user can move indicator 51 rapidly to the left. The virtual buttons play, stop, fast forward, and reverse can also be executed from a menu, etc.

Although, in the embodiment just described, the iconographic display produced by the object-based numeric analysis engine of the present invention represents how money in a household's budget is allocated, the object-based numeric analysis engine of the present invention can be used to prepare and display hypothetical budgets as can be done with conventional spreadsheets or household budget software. For example, a user can input data for a different tax rate to see how such a change reflects in the user's household budget. Similarly, a user can see what effect changing the value of the amount put in a retirement account or increasing the amount paid in rent has on the overall household budget.

For convenience, the household budget shown in FIG. 1 is relatively simple. However the present invention contemplates the ability to generate and display much more complicated household budgets. For example, there can be two inflow object icons and associated inflow boxes to represent each of the wage earners in a two income household or a single inflow object icon can represent more than one source of income. There can also be several inflows for each household or individual in a household representing separate sources of income for the household or individual. For example there can be inflow object icons and associated inflow boxes for wages income, dividend income, and capital gain income. The amount for each of these inflow boxes can be input by the user, obtained from a data source, such as a web-page for a bank, or calculated. For example, income for a dividend inflow box can be automatically calculated by multiplying the amount in a brokerage account at a particular time in the month by an appropriate yield. In order to avoid confusion as to what a particular inflow represents, when there are multiple inflow object icons, each of the icons can be separately labeled and/or given a distinctive appearance based on the type of income represented or the individual to whom the inflow object icon belongs. Also, when desired, an individual user can use the object-based numeric analysis engine to generate and display the user's individual income and expenses.

The inflow object icons can include indicators, such as different colors, which indicate that the inflows belong to particular categories. For example, outflow object icons personal income can be blue, inflow object icons representing capital gains income can be red, etc. Although the inflow object icon in FIG. 1 is in the shape of a faucet, inflow object icons can have other shapes. For example, inflow object icons can be shaped like dollar bills, personal checks, etc. The outflow object icons can also be abstract shapes such a circles, squares. triangles, etc.

Although only one account object icon/box or account is shown in FIG. 1, the object-based numeric analysis engine of the present invention can be used to generate and display information for several bank accounts as a single account object icon/box or as several icons/boxes for different bank accounts. The allocation of income to different bank accounts can be represented by separate pipes leading from a given income source to two or more different bank accounts. If a user does not care from which bank account money for expenses comes, the user can simply use a single bank account object icon to represent all of the user's bank accounts. However, a user often wants only to allocate money for expenses from a particular bank account, such as a checking account, while leaving untouched the money accumulating in another account, such as a savings account. Although account object icons/boxes are often used to represent bank accounts such as checking accounts or savings accounts from which money can be readily withdrawn, account object icons/boxes can also be used to represent less liquid assets such as, but not limited to, life insurance policies, stocks or bonds. These different kinds of assets can also be represented by different types of icons, such as a check for a checking account, a piggy bank for a savings account, a picture of a stock certificate for stocks held by the household. A general property of an account is that it represents an ongoing asset for the household. In addition, an account icon/box can also represent an ongoing liability for the household, such as an amount owed on a credit card account. In addition to being linked by pipe objects to inflow objects and outflow objects as shown in FIG. 1, accounts can be linked to other accounts by pipe objects. For example, a checking account object can be linked by a pipe object to a savings account object to allow money to be transferred from the checking account to the savings account once the savings account exceeds a minimum balance.

Accounts can include indicators, such as different colors, which indicate that the outflows belong to particular categories. For example, account object icons representing items with tax consequences can be blue, account object icons savings accounts can be red, etc. Although the account object icons in FIG. 1 are in the shape of, the account icons may have other shapes such as shaped like a ban, a slip of paper with I.O.U. printed on it, etc. The account object icons may also be abstract shapes such a circles, squares, triangles, etc.

Outflows, in general, relate to an entity's expenses. For an individual or household budget, outflows may include such items as, but not limited to, grocery expenses, entertainment expenses, loan payments, utility bills, mortgage payments, taxes, etc. For a business, budget outflows may include such items as, but not limited to, capital outlays. salaries, loan payments, employee training expenses, equipment repair expenses, etc. In general, outflows are visually connected to the icon of the inflow or account from which money for the outflow is drawn. In the case where the outflow represents a monthly or other periodic bill, a particular outflow may be permanently associated with an inflow, such as for salary income, or with an account, such as a checking account. Alternatively, a user may change the inflow or account to which the outflow, representing a monthly bill, is connected. The outflows may include indicators, such as different colors, which indicate that the outflows belong to particular categories. For example, outflow object icons representing items with tax consequences may be blue, outflow object icons representing monthly expenses may be red, etc. Although the outflow object icons in FIG. 1 are in the shape of outflows for a plumbing system, the outflows icons may have other shapes. For example, the outflow object icon representing grocery expenses may be shaped like a grocery bag, the outflow object icon representing auto expenses may be shaped like a car, the outflow object icon representing repair expenses may be shaped like a wrench, etc. The outflow object icons may also be abstract shapes such a circles, squares, triangles, etc.

Amounts entered or displayed in an outflow box may be an amount entered by a user, a fixed amount, a calculated amount or a random number. For example, for irregular expenses such as gasoline, food, entertainment, etc., a user will usually simply enter the cost of an item in an outflow box. There are still other cases, such as outflows representing taxes, where the amount entered in a particular outflow, is calculated based on the amount entered in an inflow, such as monthly income, connected to the outflow by a pipe. The amount calculated by the computer program of the present invention to be entered in a particular outflow box, such as an outflow box for real property tax or personal property tax, may also be calculated based on the value of an account, such as an account representing the value of a piece of real estate or a car, which is not connected by a pipe to the outflow.

Pipes represent connections between inflows and accounts, inflows and outflows and accounts and outflows, and between two accounts. In general, when the numeric system of the present invention is used to display the status of a household budget, money flows, like water in a plumbing system, from inflows and accounts which are higher to accounts and outflows which are lower. The pipe object icons are preferably designed so that a user may pick up a pipe on the screen connecting two icons and move it so that it connects one of the original icons to a different second icon. For example, a pipe connecting a loan payment to a checking account may be changed by the user so that the pipe connects the loan payment to a money market account, indicating that the user has changed the source of money for loan payment. Although the pipe object icons in FIG. 1 are shaped like pipes, pipe object icons according to the present invention may take other forms such as lines or arrows or any figure connecting an inflow, an outflow or an account. The pipe object icons may either be independent icons or they may be part of the inflow, account and outflow object icons. For example, each outflow may include an arrow shaped pipe icon which may be pointed by the user in the direction cash flow from an inflow or account to which the outflow is connected.

The date which is displayed by the iconographic display of the present invention may be input by the user by entering the date numerically, or supplied by the user's computer when the user activates the program to display the status of the numeric system that day, or any other means known in the computing art, etc. Because of the way the iconographic display of the present invention operates, it is even possible for the date displayed by the display to be controlled by a windows-type sliding bar which is manipulated by the user to show the status of the numeric system being displayed over time. The status of the numeric system may even be displayed dynamically by providing conventional virtual play, rewind, advance, and stop buttons on the display to allow a user to see how the status of the financial model will change over a given period of time and to allow the user to freeze the display at a particular date.

Figure 2:
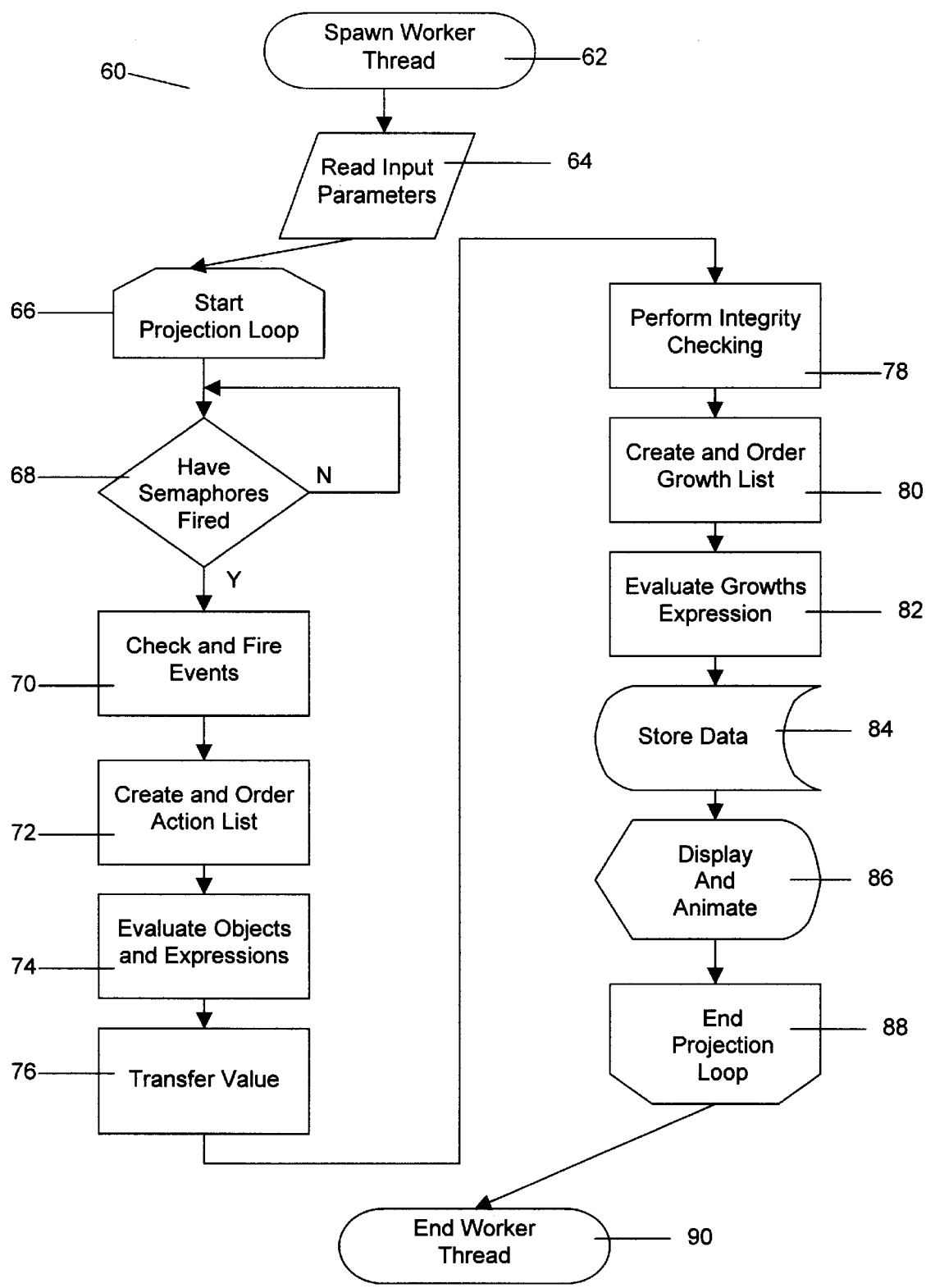
FIG. 2 is a flow chart of a numeric analysis engine of a preferred embodiment of the present invention.

FIGS. 2 through 10 illustrate how the object-based numeric analysis engine of the present invention generates the current status of the numeric system of the present invention. FIG. 2 illustrates how a object-based numeric engine of the present invention may be used to generate a household budget of the type illustrated in FIG. 1. When the numeric engine is activated for the first time each day, the numeric engine processes all of the time-based events for each day since the numeric engine was last activated. The numeric engine also periodically processes all of the monitors and non time-based events for the numeric system, preferably after each value or property of each numeric object is adjusted due to events occurring or user input.

FIG. 2 is a flow chart of the numeric analysis engine 60 of the present invention. Block 62 transfers control to box 64. Parameters input by a user are read and control is transferred to block 66. Block 66 starts a projection loop and transfers control to decision diamond 68. If the semaphores have not fired, control is transferred back to block 66. If the semaphores have fired, control is transferred to block 70. Events are checked to see if the conditions causing the events to fire have been met. If the condition for an event has been met, the event fires. After all events have been checked and the appropriate events have fired. control is to block 72. In block 72, an ordered action list is created from the numeric objects which are affected by the events which fired. Control is then transferred to block 74, where the numeric objects. Control is then transferred to block 76. InI block 76, based on the evaluations performed in block 74, value is transferred between numeric objects. Control is then transferred to block 78. In block 78, intergrity checks are performed on the value transfers between objects to insure that improper transfers have not occurred in block 76. Control is then passed to block 80 where an ordered growth list is created for numeric objects which are to grow. Then control is transferred to block 82 where the numeric objects in the growth list created in block 80 are increased or decreased in value as appropriate. Control is then transferred to block 84. In block 84, data is stored for each of the numeric objects in the numeric analysis engine. Control is then transferred to block 86 where the values for the numeric objects are displayed. Control is then transferred to block 88. In block 88, the projection loop ends, if the last day of the projection has occurred. Otherwise, control is transferred back to block 66 Then, after the last day, control is transferred to block 90 and the numeric analysis engine stops processing numeric objects. Parts or "sub-engines" of the numeric analysis engine of the present invention are shown in greater detail in FIGS. 3 through 10.

FIG. 3 illustrates a conditional object analysis sub-engine of the numeric analysis engine of the present invention for processing conditional objects, both events and monitors. This sub-engine corresponds to block 70 of FIG. 2. In the conditional object analysis sub-engine 102, block 104 gathers together all of the conditional objects for the numeric system. As long as there are still conditional objects to be processed, decision diamond 106 transfers control to block 108. Block 108 performs calculations and determines if a given conditional object fires i.e. will be executed, because the condition allowing the conditional object to fire has been met. For example, if the internal clock of the of the numeric analysis engine indicates it is Oct. 31, 2020 a conditional object, such as an event for retirement will fire. If the conditional object being processed does not fire, decision diamond 110 transfers control back to block 106. If the conditional object does fire, decision diamond 110 transfers control to block 112. Block 112 retrieves the instructions associated with the conditional object which is to fire. After retrieving instructions for the conditional object which is to fire, block 112 transfers control to block 114. Block 114 interprets the instructions for the conditional object which fires and executes these instructions which can internally change the properties of any status object of the numeric system. For example, if the event "Retirement" fires, then the sub-engine 102 indicates that that income equals zero, etc. This process is repeated by returning to decision diamond 106 until there are no more conditional objects. When there are no more conditional objects to be processed, block 106 transfers control to block 116 and sub-engine 102 de-activates and transfers control to block 120 of FIG. 4.

FIG. 4 illustrates a sub-engine 120 for processing all of the status objects for the numeric system and determines which status objects should be further processed and in what order of priority. Sub-engine 120 corresponds to block 72 in FIG. 2. Block 122 gathers all of the status objects in the numeric system being analyzed. As each status object is processed, control is transferred to decision diamond 124. As long as there are status objects still to be processed, decision diamond 124 transfers control to block 126. Block 126. decision diamond 128 performs calculations to determine if the status object fires based on the internal condition of the status object. If the status object being processed will not fire. control is transferred back to block 124 to determine if there is still a status object to be processed. If the status object being processed will fire, control is transferred to block 130. Block 130 adds the status object to an action list of objects to be further processed and then transfers control to block 124 to determine if there is still a status object to process. Once there are no further status objects to process, block 124 transfers control to block 132, which determines the dependencies of all of the status objects in the action list and sorts the action list accordingly. For example, if the inflow object "monthly income," the outflow object "income taxes," and the pipe object connecting "monthly income" to "income taxes" will fire, the inflow object will generally fire before the pipe object, thereby giving the inflow object an initial value, to allow the value to be transferred from the inflow object to the outflow object by the pipe object. The pipe object also should fire before the outflow object, so that the value to be added to the outflow object may be determined, prior to the outflow object firing, thereby receiving a value. Although only a simple example of dependencies between objects has been described, the numeric analysis engine of the present invention may handle complicated dependencies between objects as well.

FIG. 5 illustrates a sub-engine 136 evaluating, numeric objects in the action list created by sub-engine 120 in block 132. Sub-engine 136 corresponds to block 74 in FIG. 2. The process shown in sub-engine 136 is repeated to each object in the action list. Block 138 transfers one of the numeric objects in the action list to block 140. Block 140 "tokenizes" the expression associated with a numeric object into tokens i.e. sub-parts. These tokens are then lexically analyzed to determine if each token has a valid syntax. Then a parse tree is created that reflects the syntax used in the expression. The parse tree thus created is a computer representation of the flat expression and contains all of the arithmetic and logic rules needed to perform any subsequent evaluation of the numeric object. After creating the parse tree for the numeric object, block 140 transfers control to block 142. Block 142 evaluates the parse tree which assigns a value to the numeric object. If there is another object, the process repeats. Block 144 returns control to block 146 of FIG. 6.

FIG. 6 illustrates a sub-engine 146 which transfers values between numeric objects based on the values determined by sub-engine 136 for the numeric objects in the action list. Sub-engine 146 corresponds to block 76 in FIG. 2. Block 148 gathers the objects in the action list and transfers control to decision diamond 150. If the object being process is an inflow, block 150 transfers control to block 152. Block 152 then sets the integrity value for the object, the value which is available to be transferred from the inflow by the pipes connected to the inflow. For example, in the household budget illustrated in FIG. 1, the integrity value is $4,000. After setting the integrity value for the object, block 152 transfers control to decision diamond 150 to determine if the next object is an inflow. If the object is not an inflow, block 150 transfers control to block 154. If the object is an outflow, block 150 transfers control to block 156. Block 156 sets the integrity value for the outflow. For example, in the household budget illustrated in FIG. 1, the integrity value for the outflow rent is $400. After the integrity value is set, block 156 transfers control to decision diamond 150 to determine if the next object is an inflow. If the object is not an outflow, block 154 transfers control to block 158. If the object is a pipe, block 158 transfers control to decision diamond 160. If the pipe is a dependent pipe, a pipe which transfers a value which is dependent on the value transferred by another pipe, decision diamond 160 transfers control to block 162. Block 162 adds the dependent pipe to a deferred pipe list and transfers control back to decision diamond 150 to determine if the next object is an inflow. If decision diamond determines that the pipe is not a dependent pipe, diamond transfers control to block 164. Block 164 transfers value source object for the pips based on a mathematical expression associated fifth the pipe and makes the valeic available for transfer to the destination object for the pipe. Block 164 then transfers control to block 166. Block 166 transfers the value made available for transfer to the destination object tor the pipe. Block 166 then transfers control back to decision diamond 150 to determine if the next object to be processed is an inflow object. Once all of the objects in the action list have been processed by sub-engine 146, block 158 transfers control to block 168 and the sub-engine 146 is deactivated and jumps to block 170 of FIG. 7.

FIG. 7 illustrates a sub-engine 170 for processing the dependent pipes. This sub-engine is accessed by block 168 of FIG. 6. Block 172 determines the dependencies of the dependent pipes in the deferred piped list and places the pipes in order based on these dependencies. Block 172 then transfers control to block 174. Block 174 transfers value between the source object and destination object for each of the dependent pipes, based on the expression associated with each of the dependent pipes. Block 174 then transfers control to block 176 and the sub-engine 170 is deactivated and returns to block 178 of FIG. 8.

Figure 8:
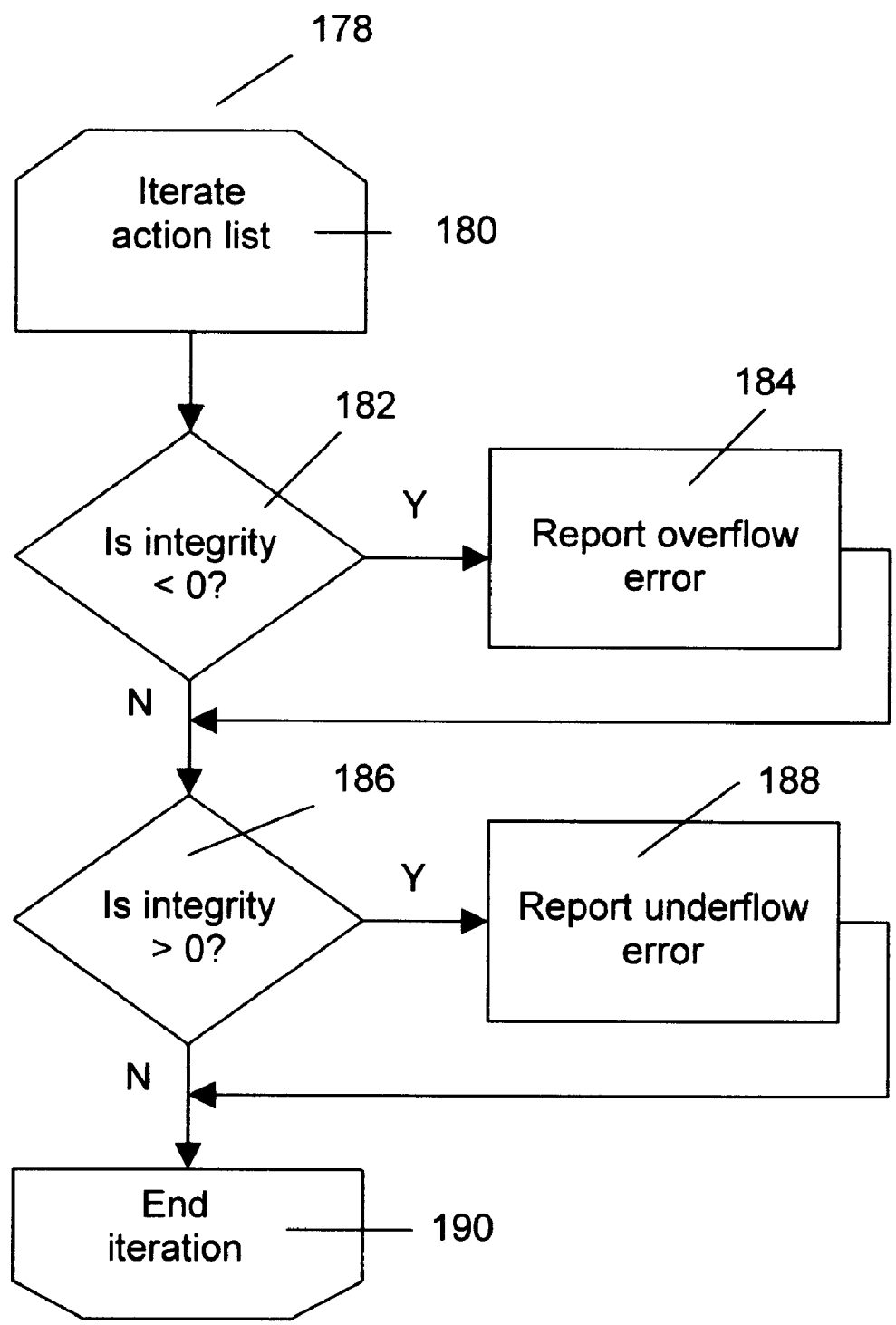
FIG. 8 is a flow chart of a sub-engine of a numeric analysis engine of the present invention for performing integrity checks of numeric objects.

FIG. 8 illustrates a sub-engine 178 for performing integrity checks on the objects in the action list. Sub-engine 178 corresponds to block 78 of FIG. 2. Block 180 gathers the objects in the action list and transfers control to block 182. Decision diamond 182 checks the integrity of the numeric object being processed. If the integrity is less than zero, then decision diamond 182 transfers control to block 184. If the integrity of the object is not less than zero, then block 182 transfers control to block 186. If control is transferred to block 184, block 184 reports an overflow error and transfers control to decision diamond 186. An example of the integrity of an object being less than zero is if more than $4,000 in value is indicated as being transferred from an income inflow having a value of $4,000. Block 186 determines if the integrity of an object being processed is greater than zero. If the integrity of the object is greater than zero then decision diamond 186 transfers control to block 188. If the integrity of the object is not greater than 0, then decision diamond 182 transfers control to block 190. If control is transferred to block 188, block 188 reports an underflow error and transfers control to block 190. Block 190 terminates the processing of the object being processed, and the sub-engine re-activates to process the next object in the action list, as long as there are objects in the action list remaining to be processed. After all items in the action list are processed, sub-engine 178 returns to block 194 of FIG. 9.

If there are overflow or underflow errors, these errors may be reported to the user, indicating which objects are involved so that the user may fix the problem in the numeric system. Alternatively, a fixing program may be invoked to make the appropriate changes in the numeric objects of the numeric system of the invention to cause the numeric analysis engine of the present invention to perform properly.

Once integrity checking is performed, sub-engine 192 shown in FIG. 9 is activated to create a growth lists for the numeric objects of the numeric system of the present invention. Sub-engine 192 corresponds to block 80 of FIG. 2. Block 194 of sub-engine 192 gathers together all of the objects of the numeric system and provides them one at a time to decision diamond 196. As long as there are still objects to process, diamond 196 transfers control to block 198. Block 198 determines if the object being processed should grow based on a condition being satisfied, such as a particular day of the month occurring. Block 198 then transfers control to decision diamond 200. If the object will not "fire" i.e. grow, decision diamond 200 transfers control to block 202. It the object being processed will not grow, decision diamond 200 transfers control back to block 196. Block 202 adds objects which will grow to a growth list for further processing. After adding the object to the growth list, block 202 transfers control back to block 196 to process another object. Once all of the objects have been processed, block 196 transfers control to block 204. Block 204 determines the dependencies among the objects in the growth list and sorts the growth list accordingly. Block 204 then transfers control to block 206 and de-activates sub-engine 192 and returns to block 208 of FIG. 10.

FIG. 10 shows sub-engine 208 which grows each of the objects on the growth list created by sub-engine 192. Sub-engine 208 corresponds to block 82 in FIG. 2. Block 210 of sub-engine 208 provides each of the objects in the growth list in order to block 212. Block 212 evaluates the growth tree for the object being processed and transfers control to block 214. Block 214 assigns a value to the growth of the object based on the evaluation performed in block 212 and add this value to the value of the object. Block 210 then transfers control to lock 216 which ends the processing for the current object and transfers control back to block 210 to process the next object in order as long as there are objects remaining to be processed. When all objects are processed, block 210 transfers control to block 84 of FIG. 2.

Although one embodiment of the numeric analysis engine of present invention has been described and illustrated in the drawing figures, there are many ways that the numeric analysis engine of the present invention could be put together using various combinations of sub-engines.

In addition to providing a numeric analysis engine, the present invention also provides single icons which represent the rows and columns of a conventional computer spreadsheet. Because each object of the present invention can have a number of mathematical functions associated therewith each object may function like a row or column of a conventional spreadsheet. Because a single icon of the present invention may represent each object, a user can treat the icons as the rows and/or columns of a spreadsheet and the pipe objects as mathematical relationships i.e. computer programs which link the rows and columns of a spreadsheet. Therefore, the novel icons of the present invention allow a user to display on a single level, information which would conventionally require several levels of spreadsheet displays.

The present invention is preferably used with a windows-type computer operating system such as Microsoft Windows®, Microsoft Windows NT®, UNIX° etc. which employ icons to display information to a user.

Although the present invention has been primarily described as to how it may be used in connection with tracking and planning an individual's, a household's or a business' finances and budgets, the present invention may have other uses as well, besides illustrating an entity's financial status, actual or hypothetical. For example, the present invention may be used to display how many goods produced by a business will be sold and how many goods will need to be inventoried depending on market conditions. When the present invention is used in this way, the inflows can represent various goods produced by a business, the outflows can represent the goods sold, and the accounts can represent the goods which have been produced but have not yet been sold, The present intention may also be used to keep track of service related items such as the number of seats a available on planes of an airline, or the number and type of employees or employee hours availales to do particular projects, etc.

Although the present invention has been fully described in conjunction with the preferred embodiment thereof with reference to the accompanying drawings it is to be understood that various changes and modifications may be apparent to those skilled in the art. Such changes and modifications are to be understood as included within the scope of the present invention as defined by the appended claims unless they depart therefrom.

What is claimed is:

1. A method implemented in a computer system for dynamically providing the financial status of an entity to a user comprising the steps of:

generating at least one first inflow object having an initial value and properties, said inflow object representing a monetary amount paid to or to be paid to said entity;

generating at least one first account object having an initial value and properties, said first account object representing a monetary amount held by, to be held by, owed by, or to be owed by said entity;

generating at least one first pipe object which defines a first mathematical relationship between said at least one inflow object and said at least one first account object;

generating an adjusted value for said first inflow object based on at least one member of the group consisting of said first inflow object initial value, said first inflow object properties, said first account object initial value, said first account object properties, and said first mathematical relationship;

generating an adjusted value for said first account object based on at least one member of the group consisting of said first inflow object initial value, said first inflow object properties, said first account object initial value, said first account object properties, and said first mathematical relationship; and displaying on a visual display apparatus said the adjusted value of said first inflow object, the adjusted value of said first account object, and a first displayed relationship between said first inflow object and said first account object to thereby provide the user with the financial status of said entity, wherein said first displayed relationship represents said first pipe object.

2. The method of claim 1, wherein at least one member of the group consisting of said first inflow object initial value, said first inflow object properties, and said first inflow object adjusted value is generated when an event object fires.

3. The method of claim 1, wherein at least one member of the group consisting of said first account object initial value, said first account object properties, and said first account object adjusted value is venerated when an event object fires.

4. The method of claim 1, wherein at least one member of the group consisting, of said first inflow object initial value, said first inflow object properties, and said first inflow object adjusted value is generated when a monitor object fires.

5. The method of claim 1, wherein at least one member of the group consisting of said first account object initial value, said first account object properties, and said first account object adjusted value is generated when a monitor object fires.

6. The method of claim 1, further comprising the step of:

generating at least one first variable object having a value and properties.

7. The method of claim 6, wherein at least one member of the group consisting of said first inflow object initial value, said first inflow object properties, and said first inflow object adjusted value is generated based on at least one member of the group consisting of said first variable object value and said first variable object properties.

8. The method of claim 6, wherein at least one member of the group consisting of said first account object initial value, said first account object properties, and said first account object adjusted value is generated based on at least one member of the group consisting of said first variable object value and said first variable object properties.

9. The method of claim 6, wherein said at least one first variable object comprises at least two first variable objects.

10. The method of claim 9, wherein at least one member of the group consisting of said first inflow object initial value, said first inflow object properties, and said first inflow object adjusted value is generated based on at least one member of the group consisting, of the value and properties of one of said first variable objects and wherein at least one member of the group consisting of said first account object initial value, said first account object properties, and said first account object adjusted value is generated based on the value and properties of a second one of said first variable objects.

11. The method of claim 6, wherein at least one member of the group consisting of said first variable object value and said first variable object properties is generated when an event fires.

12. The method of claim 6, wherein at least one member of the group consisting of said first variable object value and said first variable object properties is altered when an event fires.

13. The method of claim 6, wherein at least one member of the group consisting of said first variable object value and said first variable object properties is generated when a monitor fires.

14. The method of claim 6, wherein said at least one member of the group consisting of said first variable object value and said first variable object properties is altered when a monitor fires.

15. The method of claim 1, further comprising the step of:
altering said first mathematical relationship defined by said first pipe object when an event object fires.

16. The method of claim 1, further comprising the step of:
altering said first mathematical relationship defined by said at least one first pipe object when a monitor object fires.

17. The method of claim 1, further comprising the step of:
generating a first supplementary pipe object defining a supplementary first mathematical relationship between said first inflow object and said first account object when a monitor object fires.

18. The method of claim 1, wherein said at least one first inflow object comprises at least two first inflow objects.

19. The method of claim 1 wherein said at least one first account object comprises at least two first account objects.

20. The method of claim 1, wherein said at least one first pipe object comprises at least two first pipe objects, each of said at least two first pipe objects defining a mathematical relationship between said at least one first inflow object and said at least one first outflow object.

21. The method of claim 1, further comprising the steps of:
generating at least one first outflow object having an initial value and properties, said outflow object representing a monetary amount paid by or to be paid by said entity;
generating at least one second pipe object which defines a second mathematical relationship between said at least one account object and said at least one first outflow object;
adjusting said adjusted value for said first account object based on at least one member of the group consisting of said first outflow object initial value, said first outflow object properties, and said second mathematical relationship to generate a second adjusted value for said first account;
generating a first adjusted value for said first outflow object based on at least one member of the group consisting of said first account object second adjusted value, said first account object properties, said first outflow object initial value said first outflow object properties, and said second mathematical relationship; and
displaying on said visual display apparatus the adjusted value of said first outflow object and a second displayed relationship between said first account object and said first outflow object as part of said financial status of said entity, wherein said second displayed relationship represents said first pipe object.

22. The method of claim 21, further comprising the steps of:
generating at least one second outflow object having an initial value and properties, said second outflow object representing, a monetary amount paid to or to be paid to said entity;
generating at least one third pipe object which defines a third mathematical relationship between said at least one first inflow object and said at least one second outflow object;
adjusting said first inflow object adjusted value based on at least one member of the group consisting of said second outflow object initial value said second outflow object properties, and said third mathematical relationship to generate a third adjusted value for said first inflow object;
generating an adjusted value for said second outflow object based on at least one member of the group consisting of said first inflow object adjusted value, said first inflow object properties, said second outflow object initial value, said second outflow object properties, and said third mathematical relationship; and
displaying on said visual display apparatus the adjusted value of said second outflow object and a third displayed relationship between said first inflow object and said second outflow object as part of said financial status of said entity, wherein said third displayed relationship represents said third pipe object.

23. The method of claim 21, wherein said at least one first outflow object comprises at least two first outflow objects.

24. The method of claim 21, wherein at least one member of the group consisting of said first outflow object initial value, said first outflow object properties, and said first outflow object adjusted value is generated when an event object fires.

25. The method of claim 21, wherein at least one member of the group consisting of said first outflow object initial value, said first outflow object properties, and said first outflow object adjusted value is generated when a monitor object fires.

26. The method of claim 21, further comprising the step of:
altering said second mathematical relationship defined by said at least one second pipe object when an event object fires.

27. The method of claim 21, further comprising the step of:
altering said second mathematical relationship defined by said at least one second pipe object when a monitor object fires.

28. The method of claim 21 further comprising the steps of:
generating at least one second outflow object having an initial value and properties, said second outflow object representing a monetary amount paid by or to be paid by said entity;
generating at least one third pipe object which defines a third mathematical relationship between said at least one first inflow object and said at least one second outflow object;

adjusting said first inflow object adjusted value based on at least one member of the group consisting of said first outflow object initial value, said first outflow object properties, and said second mathematical relationship to generate a second adjusted value for said first inflow object;

generating an adjusted value for said second outflow object based on at least one member of the group consisting of said first inflow object adjusted value, said first inflow object properties, said second outflow object initial value, said second outflow object properties, and said third mathematical relationship; and displaying on said visual display apparatus the adjusted value of said second outflow object and a third displayed relationship between said first inflow object and said second outflow object as part of said financial status of said entity, wherein said third displayed relationship represents said third pipe object.

29. The method of claim 28, wherein said at least one second outflow object comprises at least two first outflow objects.

30. The method of claim 28, wherein at least one member of the group consisting of said second outflow object initial value, said second outflow object properties, and said second outflow adjusted value is generated when an event object fires.

31. The method of claim 28, wherein at least one member of the group consisting of said second outflow object initial value, said second outflow object properties, and said one second outflow object adjusted value is generated when a monitor object fires.

32. The method of claim 28, further comprising the step of:

altering said third mathematical relationship defined by said third pipe object when an event object fires.

33. The method of claim 28, further comprising the step of:

altering said third mathematical relationship defined by said third pipe object when a monitor object fires.

34. The method of claim 1, further comprising the step of:

displaying an icon representing said at least one first inflow object on said visual display apparatus.

35. The method of claim 34, wherein said at least one first inflow object icon is a passive icon.

36. The method of claim 34, wherein said at least one first inflow object icon is an active icon.

37. The method of claim 34, further comprising displaying said initial value of said at least one first inflow object on said visual display apparatus as part of said financial status of said entity.

38. The method of claim 34, wherein said at least one first inflow object comprises at least two first inflow objects and a respective individual icon is displayed on said visual display apparatus for each of said at least two first inflow objects.

39. The method of claim 34, wherein said at least one first inflow object comprises at least two first inflow objects and said at least two first inflow objects are represented on said visual display apparatus by at least one group icon.

40. The method of claim 1, further comprising displaying said initial value of said at least one first inflow object on said visual display apparatus as part of said financial status of said entity.

41. The method of claim 1, wherein said at least one first inflow object generation step comprises the sub-steps of:

generating a preliminary value for said inflow object; and adjusting said preliminary value for said inflow object to generate an initial value for said inflow object when an event object fires.

42. The method of claim 1, wherein said at least one first inflow object generation step comprises the sub-steps of:

generating a preliminary value for said inflow object; and adjusting said preliminary value for said inflow object to generate an initial value for said inflow object when a monitor object fires.

43. The method of claim 1, further comprising the step of:

displaying an icon representing said at least one first account object on said visual display apparatus.

44. The method of claim 43, wherein said it least one first account object icon is a passive icon.

45. The method of claim 43, wherein said at least one first account object icon is an active icon.

46. The method of claim 43, wherein said at least one first account object comprises at least two first account objects and a respective individual icon is displayed on said visual display apparatus for each of said at least two first account objects.

47. The method of claim 43, wherein said at least one first account object comprises at least two first account objects and said at least two first account objects are represented on said visual display by at least one group icon.

48. The method of claim 1, further comprising the step of:

displaying an icon representing said at least one first pipe object on said visual display apparatus.

49. The method of claim 48, wherein said at least one first pipe object icon is a passive icon.

50. The method of claim 49, wherein said at least one first pipe object is an active icon.

51. The method of claim 48, wherein said at least one first pipe object comprises at least two first pipe objects and a respective individual icon is displayed on said visual display apparatus for each of said at least two first pipe objects.

52. The method of claim 48, wherein said at least one first pipe object comprises at least two first pipe objects and said at least two first pipe object are represented on said visual display by at least one group icon.

53. The method of claim 1, further comprising the step of:

displaying on said visual display apparatus a heterogeneous group icon representing said at least one first inflow object, said at least one first account object and said at least one first pipe object.

54. A method implemented in a computer system for dynamically providing the financial status of an entity to a user comprising the steps of:

generating at least one first account object having an initial value and properties, said first account object representing a monetary amount held by, to be held by, owed by, or to be owed bit said entity;

generating at least one first outflow object having an initial value and properties, said first outflow object representing a monetary amount paid by or to be paid by said entity;

generating at least one first pipe object which defines a first mathematical relationship between said at least one account object and said at least one first outflow object;

generating an adjusted value for said first account object based on at least one member of the group consisting of said first account object initial value, said first account object properties, said first outflow object initial value, said first outflow object properties, and said first mathematical relationship;

generating an adjusted value for said first outflow object based on at least one member of the group consisting of said first account object initial value, said first account object properties, said first outflow object initial value, said first outflow object properties, and said first mathematical relationship; and displaying on a visual display apparatus the adjusted value of said first account object, the adjusted value of said first outflow object, and a first displayed relationship between said first account object and said first outflow object to thereby provide the user with the financial status of said entity, wherein said first displayed relationship represents said first pipe object.

55. The method of claim 54, wherein at least one member of the group consisting of said first account object initial value, said first account object properties, and said first account object adjusted value is generated when an event object fires.

56. The method of claim 54, wherein at least one member of the group consisting of said first outflow object initial value, said first outflow object properties, and said first outflow object adjusted value is generated when an event object fires.

57. The method of claim 54, wherein at least one member of the group consisting of said first account object initial value, said first account object properties, and said first account object adjusted value is generated when a monitor object fires.

58. The method of claim 54, wherein at least one member of the group consisting of said first outflow object initial value, said first outflow object properties, and said first outflow object adjusted value is generated when a monitor object fires.

59. The method of claim 54, further comprising the step of:

generating at least one first variable object having a value and properties.

60. The method of claim 59, wherein at least one member of the group consisting of said first account object initial value, said first account object properties and said first account object adjusted value is generated based on at least one member of the group consisting of the value and properties of said first variable object.

61. The method of claim 59, wherein at least one member of the group consisting of said first outflow object initial value, said first outflow object properties, and said first outflow object adjusted value is generated based on at least one member of the group consisting of the value and properties of one first variable object.

62. The method of claim 59, wherein said at least one first variable object comprises at least two first variable objects.

63. The method of claim 62, wherein at least one member of the group consisting of said first account object initial value, said first account object properties, and said first account object adjusted value is generated based on at least one member of the group consisting of the value and properties of one of said first variable objects and wherein at least one member of the group consisting of said first outflow object initial value, said first outflow object properties, and said first outflow object adjusted value is generated based on the value and properties of a second one of said first variable objects.

64. The method of claim 59, wherein at least one member of the group consisting of said first variable object value and said first variable object properties is generated when an event fires.

65. The method of claim 59, wherein at least one member of the group consisting of said first variable object value and said first variable object properties is altered when an event fires.

66. The method of claim 59, wherein at least one member of the group consisting of said first variable object value and said first variable object properties is generated when a monitor fires.

67. The method of claim 59, wherein said at least one member of the group consisting of said first variable object value and said first variable object properties is altered when a monitor fires.

68. The method of claim 54, further comprising the step of:

altering said first mathematical relationship defined by said first pipe object when an event object fires.

69. The method of claim 54, further comprising the step of:

altering said first mathematical relationship defined by said at least one first pipe object when a monitor object fires.

70. The method of claim 54, wherein said at least one first account object comprises at least two first account objects.

71. The method of claim 54, wherein said at least one first outflow object comprises at least two first outflow objects.

72. The method of claim 54, wherein said at least one first pipe object comprises at least two first pipe objects, each of said at least two first pipe objects defining a mathematical relationship between said at least one first account object and said at least one first outflow object.

73. The method of claim 54, further comprising the step of:

displaying an icon representing said at least one first account object on a said visual display apparatus.

74. The method of claim 73, wherein said at least one first account object icon is a passive icon.

75. The method of claim 73, wherein said at least one first account object icon is an active icon.

76. The method of claim 73, further comprising displaying said adjusted value of said at least one first account object on said visual display apparatus.

77. The method of claim 73, wherein said at least one first account object comprises at least two first account objects and a respective individual icon is displayed on said visual display apparatus for each of said at least two first account objects.

78. The method of claim 73, wherein said at least one first account object comprises at least two first account objects and said at least two first account objects are represented on said visual display by at least one group icon.

79. The method of claim 54, further comprising the step of:

displaying an icon representing said at least one first outflow object on said visual display apparatus.

80. The method of claim 79, wherein said at least one first outflow object icon is a passive icon.

81. The method of claim 79, wherein said at least one first outflow object icon is an active icon.

82. The method of claim 79, further comprising displaying said adjusted value of said at least one first outflow object on said visual display apparatus.

83. The method of claim 79, wherein said at least one first outflow object comprises at least two first account objects and a respective individual icon is displayed on said visual display apparatus for each of said at least two first outflow objects.

84. The method of claim 79, wherein said at least one first outflow object comprises at least two first outflow objects and said at least two first outflow objects are represented on said visual display by at least one group icon.

85. The method of claim 54, further comprising the step of:

displaying an icon representing said at least one first pipe object on said visual display apparatus.

86. The method of claim 85, wherein said at least one first pipe object icon is a passive icon.

87. The method of claim 85, wherein said at least one first pipe object icon is an active icon.

88. The method of claim 85, wherein said at least one first pipe object comprises at least two first account objects and a respective individual icon is displayed on said visual display apparatus for each of said at least two first pipe objects.

89. The method of claim 85, wherein said at least one first pipe object comprises at least two first pipe objects and said at least two first pipe objects are represented on said visual display by at least one group icon.

90. The method of claim 54, further comprising the step of:

displaying a heterogeneous group icon representing said at least one first account object, said at least one first outflow object and said at least one first pipe object.

91. A method implemented in a computer system for dynamically providing the financial status of an entity to a user comprising the steps of:

generating at least one first inflow object having an initial value and properties, said inflow object representing a monetary amount paid to or to be paid to said entity;

generating at least one first outflow object having an initial value and properties, said outflow object representing a monetary amount paid by or to be paid by said entity;

generating at least one first pipe object which defines a first mathematical relationship between said at least one inflow object and said at least one first outflow object;

generating an adjusted value for said first inflow object based on at least one member of the group consisting of said first inflow object initial value, said first inflow object properties, said first outflow object initial value, said first outflow object properties, and said first mathematical relationship; and generating an adjusted value for said first outflow object based on at least one member of the group consisting of said first inflow object initial value, said first inflow object properties, said first outflow object initial value, said first outflow object properties, and said first mathematical relationship; and displaying on a visual display apparatus the adjusted value of said first account object, the adjusted value of said first outflow object, and a first displayed relationship between said first account object and said first outflow object to thereby provide the user with the financial status of said entity, wherein said first displayed relationship represents said first pipe object.

92. The method of claim 91, wherein at least one member of the group consisting of said first inflow object initial value, said first inflow object properties, and said first inflow object adjusted value is generated when an event object fires.

93. The method of claim 91, wherein at least one member of the group consisting of said first outflow object initial value, said first outflow object properties, and said first outflow object adjusted value is generated when an event object fires.

94. The method of claim 91, wherein at least one member of the group consisting of said first inflow object initial value, said first inflow object properties, and said first inflow object adjusted value is generated when a monitor object fires.

95. The method of claim 91, wherein at least one member of the group consisting of said first outflow object initial value, said first outflow object properties, and said first outflow object adjusted value is generated when a monitor object fires.

96. The method of claim 91, further comprising the step of:

generating at least one first variable object having a value and properties.

97. The method of claim 96. wherein at least one member of the group consisting of said first inflow object initial value, said first inflow object properties, and said first inflow object adjusted value is based on at least one member of the group of the value and properties of said first variable object.

98. The method of claim 96, wherein at least one member of the group consisting of said first outflow object initial value, said first outflow object properties, and said first outflow object adjusted value is generated based on at least one member of the group consisting of the value and properties of said first variable object.

99. The method of claim 97, wherein said at least one first variable object comprises at least two first variable objects.

100. The method of claim 99, wherein at least one member of the group consisting of said first inflow object initial value, said first inflow object properties, and said first inflow object adjusted value is generated based on at least one member of the group consisting of the value and properties of one of said first variable objects and wherein at least one member of the group consisting of said first outflow object initial value, said first outflow object properties, and said first outflow object adjusted value is (generated based on the value and properties of a second one of said first variable objects.

101. The method of claim 97, wherein at least one member of the group consisting of said first variable object value and said first variable object properties is generated when an event fires.

102. The method of claim 97, wherein at least one member of the group consisting of said first variable object value and said first variable object properties is altered when an event fires.

103. The method of claim 97, wherein at least one member of the group consisting of said first variable object value and said first variable object properties is generated when a monitor fires.

104. The method of claim 97, wherein said at least one member of the group consisting of said first variable object value and said first variable object properties is altered when a monitor fires.

105. The method of claim 91, further comprising the step of:

altering said first mathematical relationship defined by said first pipe object when an event object fires.

106. The method of claim 91, further comprising the step of:

altering said first mathematical relationship defined by said at least one first pipe object when a monitor object fires.

107. The method of claim 91, wherein said at least one first inflow object comprises at least two first inflow objects.

108. The method of claim 91, wherein said at least one first outflow object comprises at least two first outflow objects.

109. The method of claim 91, wherein said at least one first pipe object comprises at least two first pipe objects, each of said at least two first pipe objects defining, a mathematical relationship between said at least one first inflow object and said at least one first outflow object.

110. The method of claim 91, wherein said at least one first inflow object generation step comprises the sub-steps of:
  generating a preliminary value for said inflow object; and
  adjusting said preliminary value for said inflow object to generate an initial value for said inflow object when an event object fires.

111. The method of claim 91, wherein said at least one first inflow object generation step comprises the sub-steps of:
  generating a preliminary value for said inflow object; and
  adjusting said preliminary value for said inflow object to generate an initial value for said inflow object when a monitor object fires.

112. The method of claim 91, further comprising the step of:
  displaying, an icon representing said at least one first inflow object on said visual display apparatus.

113. The method of claim 112, wherein said at least one first inflow object icon is a passive icon.

114. The method of claim 112, wherein said at least one first inflow object icon is an active icon.

115. The method of claim 112 further comprising displaying said initial value of said at least one first inflow object on said visual display apparatus.

116. The method of claim 112, wherein said at least one first inflow object comprises at least two first inflow objects and a respective individual icon is displayed on said visual display apparatus for each of said at least two first inflow objects.

117. The method of claim 112, wherein said at least one first inflow object comprises at least two first inflow objects and said at least two first inflow objects are represented on said visual display by at least one group icon.

118. The method of claim 91, further comprising the step of:
  displaying an icon representing said at least one first outflow object on said visual display apparatus.

119. The method of claim 118, wherein said at least one first outflow object icon is a passive icon.

120. The method of claim 118, wherein said at least one first outflow object icon is an active icon.

121. The method of claim 118, further comprising displaying said adjusted value of said at least one first outflow object on said visual display apparatus.

122. The method of claim 118, wherein said at least one first outflow object comprises at least two first inflow objects and a respective individual icon is displayed on said visual display apparatus for each of said at least two first outflow objects.

123. The method of claim 118 wherein said at least one first outflow object comprises at least two first outflow objects and said at least two first outflow objects are represented on said visual display by at least one group icon.

124. The method of claim 91, further comprising displaying said adjusted value of said at least one first outflow object on said visual display apparatus.

125. The method of claim 91, further comprising the step of:
  displaying an icon representing said at least one first pipe object on said visual display apparatus.

126. The method of claim 91, wherein said at least one first pipe object icon is a passive icon.

127. The method of claim 126, wherein said at least one first pipe object icon is an active icon.

128. The method of claim 126, wherein said at least one first pipe object comprises at least two first pipe objects and a respective individual icon is displayed on said visual display apparatus for each of said at least two first pipe objects.

129. The method of claim 126, wherein said at least one first pipe object comprises at least two first pipe objects and said at least two first pipe objects are represented on said visual display by at least one group icon.

130. The method of claim 91, further comprising the step of:
  displaying a heterogeneous group icon representing said at least one first inflow object, said at least one first outflow object and said at least one first pipe object.

131. A method implemented in a computer system for dynamically providing the financial status of an entity to a user comprising the steps of:
  generating at least one first account object having an initial value and properties, said first account object representing a first monetary amount held by, to be held by, owed by or to be owed by said entity;
  generating at least one second account object having an initial value and properties, said second account object representing a second monetary amount held by, to be held by, owed by or to be owed by said entity;
  generating at least one first pipe object which defines a first mathematical relationship between said at least one first account object and said at least one second account object;
  generating an adjusted value for said first account object based on at least one member of the group consisting of said first account object initial value, said first account object properties, said second account object initial value, said second account object properties, and said first mathematical relationship;
  generating an adjusted value for said second account object based on at least one member of the group consisting of said first account object initial value, said first account object properties, said second account object initial value, said second account object properties, and said first mathematical relationship; and
  displaying on a visual display apparatus the adjusted value of said first account object, the adjusted value of said second account object, and a first displayed relationship between said first account object and said second account object to thereby provide the user with the financial status of said entity, wherein said first displayed relationship represents said first pipe object.

132. The method of claim 131, wherein at least one member of the group consisting of said first account object initial value, said first account object properties, and said first account object adjusted value is generated when an event object fires.

133. The method of claim 131, wherein at least one member of the group consisting of said second account object initial value, said second account object properties and said second account object adjusted value is generated when an event object fires.

134. The method of claim 131, wherein at least one member of the group consisting of said first account object initial value, said first account object properties, and said first account object adjusted value is generated when a monitor object fires.

135. The method of claim 131, wherein at least one member of the group consisting of said second account object initial value, said second account object properties, and said second account object adjusted value is generated when a monitor object fires.

136. The method of claim 131, further comprising the step of:

generating at least one first variable object having a value and properties.

137. The method of claim 136, wherein said first inflow object adjusted value is generated based on at least one member of the group consisting of the value and properties of said first variable object.

138. The method of claim 136, wherein said first account object adjusted value is generated based on at least one member of the group consisting of the value and properties of said first variable object.

139. The method of claim 136, wherein said at least one first variable object comprises at least two first variable objects.

140. The method of claim 139, wherein at least one member of the group consisting of said first account object initial value, said first account object properties and said first account object adjusted value is generated based on at least one member of the group consisting of the value and properties of one of said first variable objects and wherein at least one member of the group consisting of said second account object initial value, said second account object properties, and said second account object adjusted value is generated based on the value and properties of a second one of said first variable objects.

141. The method of claim 136, wherein at least one member of the group consisting of said first variable object value and said first variable object properties is generated when an event fires.

142. The method of claim 136, wherein at least one member of the group consisting of said first variable object value and said first variable object properties is altered when an event fires.

143. The method of claim 136, wherein at least one member of the group consisting of said first variable object value and said first variable object properties is generated when a monitor fires.

144. The method of claim 136, wherein at least one member of the group consisting of said first variable object value and said first variable object properties is altered when a monitor fires.

145. The method of claim 131, further comprising the step of:

altering said first mathematical relationship defined by said first pipe object when an event object fires.

146. The method of claim 131, further comprising the step of:

altering, said first mathematical relationship defined by said at least one first pipe object when a monitor object fires.

147. The method of claim 131, further comprising the step of:

generating a first supplementary pipe object defining a supplementary first mathematical relationship between said first account object and said second account object when a monitor object fires.

148. The method of claim 131, wherein said at least one first account object comprises at least two first account objects.

149. The method of claim 131, wherein said at least one second account object comprises at least two second account objects.

150. The method of claim 131, wherein said at least one first pipe object comprises at least two first pipe objects, each of said at least two first pipe objects defining a mathematical relationship between said at least one first account object and said at least one second account object.

151. The method of claim 131, wherein said at least one first account object generation step comprises the sub-steps of:

generating a preliminary value for said inflow object; and adjusting said preliminary value for said inflow object to generate an initial value for said inflow object when an event object fires.

152. The method of claim 131, wherein said at least one first account object generation step comprises the sub-steps of:

generating a preliminary value for said inflow object; and adjusting said preliminary value for said inflow object to generate an initial value for said inflow object when a monitor object fires.

153. The method of claim 131, further comprising the step of:

displaying an icon representing said at least one first account object on said visual display apparatus.

154. The method of claim 153, wherein said at least one first account object icon is a passive icon.

155. The method of claim 153, wherein said at least one first account object icon is an active icon.

156. The method of claim 153, further comprising displaying said adjusted value of said at least one first account object on said visual display apparatus.

157. The method of claim 153, wherein said at least one first account object comprises at least two first account objects and a respective individual icon is displayed on said visual display apparatus for each of said at least two first account objects.

158. The method of claim 153, wherein said at least one first account object comprises at least two first account objects and said at least two first account objects are represented on said visual display by at least one group icon.

159. The method of claim 131, further comprising the step of:

displaying an icon representing said at least one second account object on said visual display apparatus.

160. The method of claim 159, wherein said at least one second account object icon is a passive icon.

161. The method of claim 159, wherein said at least one second account object icon is an active icon.

162. The method of claim 159, further comprising displaying said adjusted value of said at least one second account object on said visual display apparatus.

163. The method of claim 159, wherein said at least one second account object comprises at least two first account objects and a respective individual icon is displayed on said visual display apparatus for each of said at least two second account objects.

164. The method of claim 159, wherein said at least one second account object comprises at least two second account objects and said at least two second account objects are represented on said visual display by at least one group icon.

165. The method of claim 131, further comprising displaying said adjusted value of said at least one second account object on said visual display apparatus.

166. The method of claim 131, further comprising the step of:

displaying an icon representing said at least one first pipe object on said visual display apparatus.

167. The method of claim 131, wherein said at least one first pipe object icon is a passive icon.

168. The method of claim 167, wherein said at least one first pipe object icon is an active icon.

169. The method of claim 167, wherein said at least one first pipe object comprises at least two first pipe objects and a respective individual icon is displayed on said visual display apparatus for each of said at least two first pipe objects.

170. The method of claim 167, wherein said at least one first pipe object comprises at least two first pipe objects and said at least two first pipe objects are represented on said visual display by at least one group icon.

171. A numeric object having a growth property implemented in a computer system.

172. The numeric object of claim 171, wherein said numeric object comprises an inflow object.

173. The numeric object of claim 171, wherein said numeric object comprises an outflow object.

174. The numeric object of claim 171, wherein said numeric object comprises an account object.

175. The numeric object of claim 171, wherein said numeric object comprises a variable object.

176. A single numeric object comprising a column of cells of a spreadsheet displayed on a visual display apparatus as part of a display of the financial status of an entity, said single numeric object representing a monetary amount paid to, to be paid to, held by, to be held by, owed by, to be owed by, paid by or to be paid by said entity.

177. The numeric object of claim 176, wherein said numeric object is represented on said visual display apparatus by at least one icon.

178. A single numeric object comprising a row of cells of a spreadsheet displayed on a visual display apparatus as part of a display of the financial status of an entity, said single numeric object representing a monetary amount paid to, to be paid to, held by, to be held by, owed by, to be owed by, paid by or to be paid by said entity.

179. The numeric object of claim 178, wherein said numeric object is represented on said visual display apparatus by at least one icon.

180. A method implemented in a computer system for dynamically providing the financial status of an entity to a user comprising the steps of:

generating at least one first numeric object having an initial value and properties, said at least one first numeric object representing a monetary amount paid to, to be paid to, held by, to be held by, owed by, to be owed by, paid by, or to be paid by said entity or representing a value used to generate a monetary amount paid to, to be paid to, held by, to be held by, owed by, to be owed by, paid by, or to be paid by said entity;

generating at least one first conditional object;

generating an adjusted value for said first numeric object based on at least one member of the group consisting of said first numeric object initial value and said first numeric object properties when said at least one first conditional object fires; and displaying on a visual display apparatus the adjusted value of said numeric object to thereby provide the user with the financial status of said entity.

181. The method of claim 180, wherein said at least one numeric object comprises an inflow object representing a monetary amount paid to or to be paid to said entity.

182. The method of claim 180, wherein said at least one numeric object comprises an account object representing a monetary amount held by, to be held by, owed by, or to be owed by said entity.

183. The method of claim 180, wherein said at least one numeric object comprises an outflow object representing a monetary amount paid by or to be paid by said entity.

184. The method of claim 180, wherein said at least one numeric object comprises an variable object used to generate a monetary amount paid to, to be paid to, held by, to be held by, owed by, to be owed by, paid by, or to be paid by said entity.

185. The method of claim 180, wherein said at least one conditional object comprises an event object used to generate a monetary amount paid to, to be paid to, held by, to be held by, owed by to be owed by, paid by, or to be paid by said entity.

186. The method of claim 180, wherein said at least one conditional object comprises a monitor object used to generate a monetary amount paid to, to be paid to, held by, to be held by, owed by, to be owed by, paid by, or to be paid by said entity.

* * * * *